US010988897B2

(12) United States Patent
Chen et al.

(10) Patent No.: US 10,988,897 B2
(45) Date of Patent: Apr. 27, 2021

(54) CELLULOSE MATERIALS AND METHODS OF MAKING AND USING SAME

(71) Applicant: Ecoinno (H.K.) Limited, Hong Kong (CN)

(72) Inventors: George Chen, Hong Kong (CN); Koon-Yang Lee, London (GB); Alexander Bismarck, Vienna (AT); Robert Li, Hong Kong (CN)

(73) Assignee: ECOINNO (H.K.) LIMITED, Hong Kong (CN)

( * ) Notice: Subject to any disclaimer, the term of this patent is extended or adjusted under 35 U.S.C. 154(b) by 115 days.

(21) Appl. No.: 16/079,463

(22) PCT Filed: Feb. 24, 2017

(86) PCT No.: PCT/CN2017/074728
§ 371 (c)(1),
(2) Date: Aug. 23, 2018

(87) PCT Pub. No.: WO2017/144009
PCT Pub. Date: Aug. 31, 2017

(65) Prior Publication Data
US 2019/0062998 A1  Feb. 28, 2019

Related U.S. Application Data

(60) Provisional application No. 62/299,084, filed on Feb. 24, 2016.

(51) Int. Cl.
| | | |
|---|---|---|
| *D21H 11/12* | (2006.01) | |
| *D21H 27/38* | (2006.01) | |
| *D21H 11/18* | (2006.01) | |
| *D21H 19/34* | (2006.01) | |
| *B65D 65/38* | (2006.01) | |
| *B65D 85/00* | (2006.01) | |
| *A23L 3/015* | (2006.01) | |
| *D21H 27/10* | (2006.01) | |
| *D21H 17/35* | (2006.01) | |
| *D21H 17/53* | (2006.01) | |
| *D21H 17/59* | (2006.01) | |
| *D21H 17/60* | (2006.01) | |
| *D21H 25/00* | (2006.01) | |
| *D21H 25/04* | (2006.01) | |
| *D21H 27/08* | (2006.01) | |
| *B65D 85/804* | (2006.01) | |
| *C08L 1/02* | (2006.01) | |
| *C08L 23/06* | (2006.01) | |
| *C08L 23/12* | (2006.01) | |
| *C08L 67/04* | (2006.01) | |

(52) U.S. Cl.
CPC .............. *D21H 11/12* (2013.01); *A23L 3/015* (2013.01); *B65D 65/38* (2013.01); *B65D 85/00* (2013.01); *D21H 11/18* (2013.01); *D21H 17/35* (2013.01); *D21H 17/53* (2013.01); *D21H 17/59* (2013.01); *D21H 17/60* (2013.01); *D21H 19/34* (2013.01); *D21H 25/005* (2013.01); *D21H 25/04* (2013.01); *D21H 27/08* (2013.01); *D21H 27/10* (2013.01); *D21H 27/38* (2013.01); *B65D 85/8043* (2013.01); *C08L 1/02* (2013.01); *C08L 23/06* (2013.01); *C08L 23/12* (2013.01); *C08L 67/04* (2013.01); *C08L 2203/16* (2013.01)

(58) Field of Classification Search
USPC .......................................................... 162/169
See application file for complete search history.

(56) References Cited

U.S. PATENT DOCUMENTS

| | | | | |
|---|---|---|---|---|
| 5,952,105 | A | * | 9/1999 | Medoff ............... B29B 17/0026 428/411.1 |
| 9,834,651 | B2 | | 12/2017 | Lee et al. |
| 2011/0229698 | A1 | | 9/2011 | Rasmussen et al. |
| 2012/0080156 | A1 | | 4/2012 | Laleg et al. |
| 2012/0251818 | A1 | | 10/2012 | Axrup et al. |
| 2013/0273350 | A1 | | 10/2013 | Lee et al. |

FOREIGN PATENT DOCUMENTS

| | | |
|---|---|---|
| CN | 1147978 A | 4/1997 |
| CN | 1199593 A | 11/1998 |
| CN | 2328689 Y | 7/1999 |
| CN | 1278209 A | 12/2000 |
| JP | 2000303386 A | 10/2000 |
| JP | 2008088589 A | 4/2008 |
| JP | 2010503775 A | 2/2010 |
| JP | 2010242286 A | 10/2010 |
| JP | 2011524476 A | 9/2011 |
| JP | 2012057285 A | 3/2012 |
| JP | 2013510222 A | 3/2013 |
| JP | 2013064222 A | 4/2013 |
| JP | 2015519488 A | 7/2015 |
| JP | 2016526 A | 1/2016 |

(Continued)

OTHER PUBLICATIONS

Hassan, Enas A., "Improving Bagasse Pulp Paper Sheet Properties with Microfibrillated Cellulose Isolated from Xylanase-Treated Bagasse", Wood and Fiber Science, 43(1), 2011, pp. 76-82.

Nassar, Mona Abdelkader et al., "Novel coating of bagasse paper sheets by gelatin and chitosan", Nordic Pulp & Paper Research Journal, vol. 29, No. 4, 2014, pp. 741-746.

(Continued)

*Primary Examiner* — Mark Halpern
(74) *Attorney, Agent, or Firm* — Loeb & Loeb LLP

(57) ABSTRACT

The present disclosure provides materials such as cellulose based materials and composite materials. Also provided herein are methods for making or using the materials.

20 Claims, 7 Drawing Sheets

(56) References Cited

FOREIGN PATENT DOCUMENTS

| KR | 101229710 | 2/2013 |
|---|---|---|
| WO | WO-2011119977 A2 | 9/2011 |
| WO | WO-2013060934 A2 | 5/2013 |
| WO | WO-2013132017 A1 | 9/2013 |
| WO | WO-2013171373 A2 | 11/2013 |
| WO | WO-2016174348 A1 | 11/2016 |

OTHER PUBLICATIONS

Supplementary European Search Report dated Jul. 26, 2019 for Application No. EP 17 75 5838, (10 pages).
Vinay Kumar et al., "Substrate role in coating of microfibrillated cellulose suspensions", Cellulose (2017) 24:1247-1260, DOI 10.1007/s10570-017-1201-5.
A. Valadez-Gonzalez et al., "Chemical modification of henequen fibers with an organosilane coupling agent", Composites: Part B, 321-331, 1999.
B.S. Kaith et al., Graft copolymerization of MMA onto flax under different reaction conditions: a comparative study:, eXPRESS Polymer Letters, vol. 2, No. 2, 93-100, 2008.
Elyas Afra et al., "Comparative effect of mechanical beating and nanofibrillation of cellulose on paper properties made from bagasse and soft wood pulps", Carbohydrate Polymers, vol. 97, 725-730, 2013.
Geeta Mehta et al., "Effect of Fiber Surface Treatment on the Properties of Biocomposites from Nonwoven Industrial Hemp Fiber Mats and Unsaturated Polyester Resin", Journal of Applied Polymer Science, vol. 99, 1055-1068, 2006.
International Preliminary Report on Patentability for PCT/CN2017/074728 dated Aug. 28, 2018.
International Search Report for PCT/CN2017/074728 dated May 8, 2017.
Jayamol George et al., "Melt rheological behavior of short pineapple fibre reinforced low density polyethylene composites", Polymer, vol. 37, No. 24, 5421-5431, 1996.
K.C. Manikandan Nair et al., "Thermal and dynamic mechanical analysis of polystyrene composites reinforced with short sisal fibres", Composites Science and Technology, vol. 61, 2519-2529, 2001.
Laly A. Pothan et al., "The role of fibre/matrix interactions on the dynamic mechanical properties of chemically modified banana fibre/polyester composites", Composites: Part A, vol. 37, 1260-1269, 2006.
Piedad Ganan, "Surface Modification of Sisal Fibers: Effects on the Mechanical and Thermal Properties of Their Epoxy Composites" Polymer Composites, 121-127, 2005.
S. Mishra et al., "The compatibilising effect of maleic anhydride on swelling and mechanical properties of plant-reinforced novolac composites", Composites Science and Technology, vol. 60, 1729-1735, 2000.
V. Tserki et al., "A study of the effect of acetylation and propionylation surface treatments on natural fibres", Composites: Part A, vol. 36, 1110-1118, 2005.
Japanese Office Action (including English translation) for App. No. JP2018-545293, dated Jan. 6, 2021, 19 pages.

* cited by examiner

|  | Baseline - 0 min | 6 min | 30 min | 60 min |
|---|---|---|---|---|
| SEM of fibre morphology | 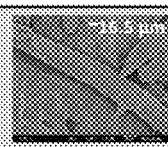 | 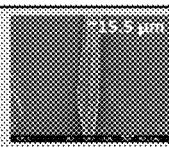 | 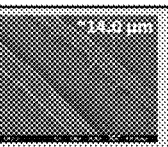 | 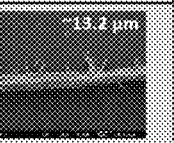 |
| Paper preform (130 gsm) | 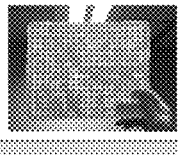 | 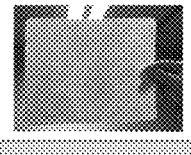 | 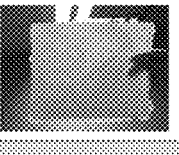 | 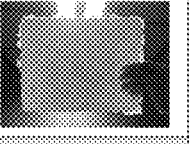 |
| Tensile strength (MPa) | 15.1 ± 1.7 | 21.1 ± 1.3 | 25.8 ± 2.9 | 27.9 ± 1.6 |
| Tensile modulus (GPa) | 1.87 ± 0.09 | 1.82 ± 0.18 | 1.94 ± 0.07 | 1.99 ± 0.23 |
| Air permeance ($10^{-5}$ m/s·KPa) | 1179.6 ± 51.3 | 135.8 ± 2.7 | 11.2 ± 0.7 | 1.2 ± 0.1 |
| WVTR (g/(m²·24h)) | 862.7 ± 49.0 | 743.4 ± 40.9 | 704.9 ± 2.7 | 603.7 ± 26.0 |
Fig. 2

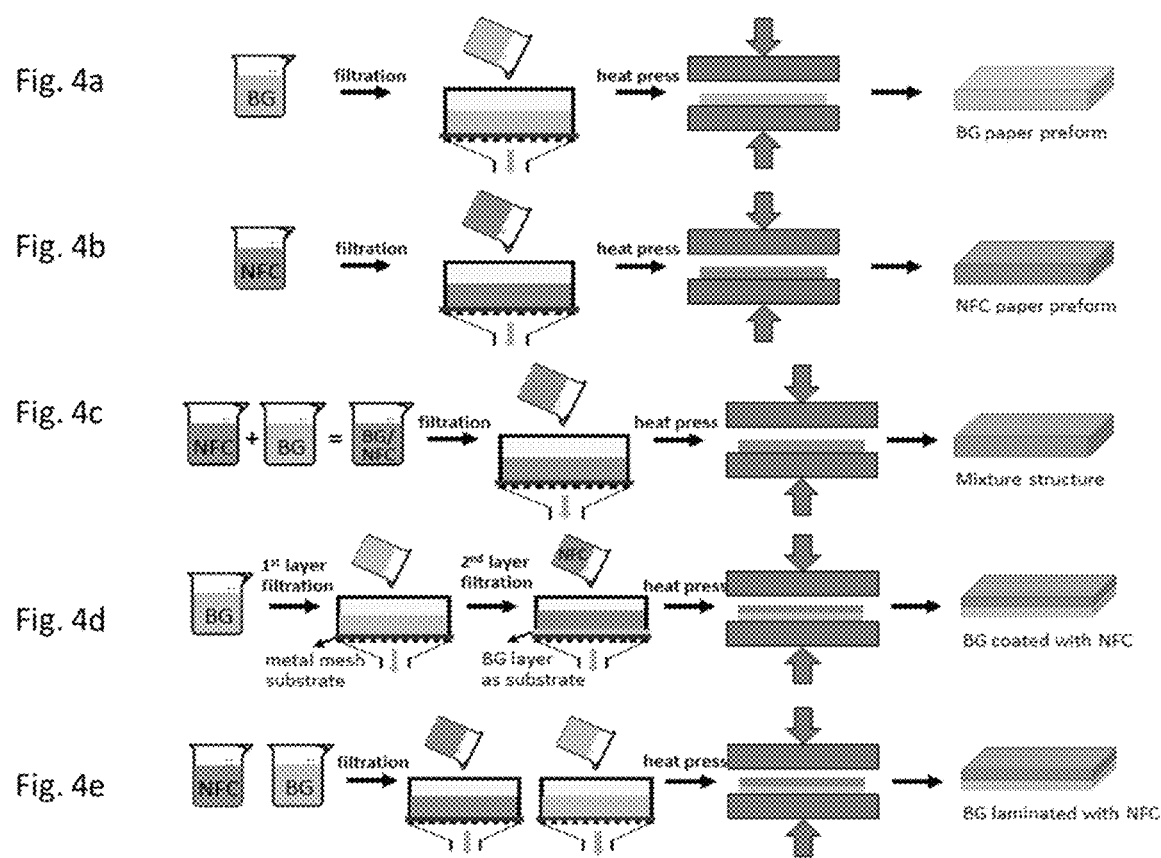

| Structure | Materials (200 gsm) | Thickness (μm) | Contact angle (degs) | Tensile strength (MPa) | Tensile modulus (GPa) | OTR (cm³/(m²·24h·MPa)) | WVTR (g/(m²·24h)) |
|---|---|---|---|---|---|---|---|
| Bulk structure | Baseline bagasse (BG) | 223 ± 33 | n/a | 26.3 ± 3.1 | 2.8 ± 0.3 | n/a (>100000) | 1351 ± 4 |
| Bulk structure | NFC | 143 ± 4 | 61 ± 13 | 103.1 ± 9.8 | 6.7 ± 0.4 | 151 ± 47 | 588 ± 3 |
| Mixture structure | 50% BG/ 50% NFC | 183 ± 5 | 35 ± 11 | 87.1 ± 7.9 | 5.4 ± 0.5 | 34 ± 24 | 612 ± 19 |
| Layer structure | 50% BG coated with 50% NFC | 193 ± 42 | 55 ± 16 | 66.9 ± 1.9 | 4.7 ± 0.6 | 12 ± 6 | 745 ± 62 |
| Layer structure | 50% BG laminated with 50% NFC | 198 ± 19 | 69 ± 8 | 64.8 ± 7.0 | 4.0 ± 0.3 | 119 ± 114 | 720 ± 16 |

*The high OTR of BG samples was out of the testing range of the tester.

Fig. 5

CELLULOSE MATERIALS AND METHODS OF MAKING AND USING SAME

CROSS-REFERENCE

This application claims the benefit of U.S. Provisional Application No. 62/299,084, filed on Feb. 24, 2016, which is incorporated herein by reference in its entirety.

INCORPORATION BY REFERENCE

All publications, patents, and patent applications herein are incorporated by reference to the same extent as if each individual publication, patent, or patent application was specifically and individually indicated to be incorporated by reference. In the event of a conflict between a term herein and a term in an incorporated reference, the term herein controls.

BRIEF SUMMARY

In some of many aspects, provided herein is a material, comprising a pulp and a fibrillated cellulose, wherein the pulp and the fibrillated cellulose are independently from a plant fiber. In some embodiments, the plant fiber is selected from the group consisting of bagasse, flax, hemp, palm, and any combination thereof. In some embodiments, the plant fiber comprises bagasse. In some embodiments, the fibrillated cellulose comprises micro-fibrillated cellulose (MFC). In some embodiments, the fibrillated cellulose comprises nano-fibrillated cellulose (NFC). In some embodiments, the pulp is mixed with the fibrillated cellulose. In some embodiments, the pulp is impregnated with the fibrillated cellulose. In some embodiments, the material comprises a layer that comprises the pulp, and wherein the layer is coated with the fibrillated cellulose. In some embodiments, the material comprises a layer that comprises the pulp, and wherein the layer is laminated with the fibrillated cellulose. In some embodiments, the material comprises: a first layer that comprises the fibrillated cellulose; a second layer that comprises the pulp; and a third layer that comprises the fibrillated cellulose, and wherein the second layer is situated between the first layer and the third layer. In some embodiments, the material comprises: a first layer that comprises the pulp; a second layer that comprises the fibrillated cellulose; and a third layer that comprises the pulp, and wherein the second layer is situated between the first layer and the third layer. In some embodiments, the fibrillated cellulose and the pulp are present in a weight ratio of about 1:100 to about 1:1, e.g., about 1:10 to about 1:1. In some embodiments, the fibrillated cellulose has an average diameter less than 100 nm. In some embodiments, the material has an average diameter of about 15 m or less, e.g., about 5 m or less. In some embodiments, the material has an envelope density of about 0.9 g/cm$^3$ or higher, e.g., about 1.2 g/cm$^3$ or higher. In some embodiments, the material has a porosity of about 48% or less, e.g., about 30% or less. In some embodiments, the material has a Gurley time of about 260 seconds or longer, e.g., longer than 38,000 seconds. In some embodiments, the material has an air permeance of about $5\times10^{-7}$ m$^3$ Pa$^{-1}$ m$^{-2}$ s$^{-1}$ or less, e.g., less than $0.03\times10^{-7}$ m$^3$ Pa$^{-1}$ m$^{-2}$ s$^{-1}$ or less. In some embodiments, the material has an oxygen transmission rate (OTR) of about 10000 cm$^3$ m$^{-2}$ d$^{-1}$ or less, e.g., about 4000 cm$^3$ m$^{-2}$ d$^{-1}$ or less. In some embodiments, the material has an OTR of about 200 cm$^3$/ (m$^2$ 24 h·atm) or less. In some embodiments, the material has a water vapour transmission rate (WVTR) of about 1000 g m$^{-2}$ d$^{-1}$ or less, e.g., about 260 g m$^{-2}$ d$^{-1}$ or less. In some embodiments, the material has a water absorption percentage of about 5% or less, e.g., about 2% or less. In some embodiments, the material has an oil absorption percentage of less than 2%, as measured with castor oil. In some embodiments, the material has no oil absorption. In some embodiments, the material has a tensile modulus higher than 3 GPa, e.g., about 5 GPa or higher. In some embodiments, the material has a tensile strength of about 35 MPa or higher, e.g., about 65 MPa or higher. In some embodiments, the material has a strain-to-failure percentage of about 2% or higher, e.g., about 4% or higher. In some embodiments, the material has a tensile index higher than 50 N m g$^{-1}$, e.g., about 88 N m g$^{-1}$ or higher. In some embodiments, the material has a tensile energy absorption of about 1800 mJ m$^{-2}$ or higher, e.g., about 5000 mJ m$^{-2}$ or higher. In some embodiments, the material has a flexural modulus 1-100 times higher than that of the plant fiber. In some embodiments, the material has a flexural strength 1-100 times higher than that of the plant fiber. In some embodiments, the material has a storage moduli 1-100 times higher than that of the plant fiber.

In some aspects, provided herein is a composite, comprising a material (e.g., support material, preform) and an additional polymer (e.g., bio-degradable polymer). In some embodiments, the additional polymer is polylactic acid (polylactide), chitin, chitosan, alginic acid, alginate salt (e.g., sodium alginate, calcium alginate, magnesium alginate, triethanolamine alginate, potassium alginate, strontium alginate, barium alginate, or ammonium alginate), propylene glycol alginate, lignin, thermoplastic starch, polyethylene, polypropylene, polyethylene glycol, polyglycolide, poly(lactide-co-glycolide), polyacrylate, polymethacrylate, poly(8-caprolactone), polyorthoester, polyanhydride, polylysine, polyethyleneimine, carboxymethylcellulose, acetylated carboxymethylcellulose, gelatin, collagen, a derivative thereof, any combination thereof, or a copolymer thereof. In some embodiments, additional polymer is in a form of fiber. In some embodiments, the additional polymer is in a form of powder. In some embodiments, the composite has a tensile modulus 1-100 times higher than that of the material. In some embodiments, the composite has a tensile strength 1-100 times higher than that of the material. In some embodiments, the composite has a flexural modulus 1-100 times higher than that of the material. In some embodiments, the composite has a flexural strength 1-100 times higher than that of the material. In some embodiments, the composite has a storage moduli 1-100 times higher than that of the material.

In some embodiments, a material or composite disclosed herein is semi-permeable to gas (e.g., heated air) and liquid (e.g., water, oil). In some embodiments, a material or composite disclosed herein is impermeable to gas (e.g., heated air) and liquid (e.g., water, oil).

In some aspects, provided herein is a consumer product made by the material or composite disclosed herein. In some embodiments, the consumer product is a motor vehicle, a home or office appliance, an electronic device, home or office furniture, or a children's product. In some embodiments, the consumer product is a small object. In some embodiments, the consumer product is a sheet, bag, container, plate, or tray. In some embodiments, the consumer product is a food serving vehicle, or a food package. In some embodiments, the consumer product is an instant noodle cup. In some embodiments, the consumer product is a container. In some embodiments, the consumer product is a coffee capsule. In some embodiments, the coffee capsule comprises capsule main body (CMB); and capsule lid (CL). In some embodiments, the CMB and/or CL is net shaped. In some embodiments, the coffee capsule has a thickness of about 0.5 to about 6 mm. In some embodiments, the coffee capsule has a thickness of about 1 to about 3 mm. In some embodiments, the consumer product comprises a base layer, a polymer layer, and/or a coating layer. In some embodiments, the base layer comprises pulp fiber, nanofibrillated cellulose (NFC), hairly fiber, or any combination thereof. In some embodiments, the pulp fiber is chlorine free. In some embodiments, the base layer further comprises a water-repellent and/or oil-repellant agent. In some embodiments, the polymer layer comprises a natural polymer that is not derived from petroleum. In some embodiments, the polymer layer is a nanocomposite. In some embodiments, the polymer layer further comprises nanoclay. In some embodiments, the nanoclay is exfoliated montmorillonite. In some embodiments, the nanoclay is incorporated into a polymer matrix. In some embodiments, the coating layer comprises NFC, hairly fiber, pulp fiber, or any combination thereof.

In some aspects, provided herein is a use of a material or composite disclosed herein for the manufacture of a consumer product. In some embodiments, the consumer product is a motor vehicle, a home or office appliance, an electronic device, home or office furniture, or a baby or kid product. In some embodiments, the consumer product is a small object. In some embodiments, the consumer product is a sheet, bag, container, plate, or tray. In some embodiments, the consumer product is a food serving vehicle. In some embodiments, the consumer product is a food package. In some embodiments, the consumer product is an instant noodle cup. In some embodiments, the consumer product is a coffee capsule. In some embodiments, the coffee capsule comprises capsule main body (CMB); and capsule lid (CL). In some embodiments, the CMB and/or CL is net shaped. In some embodiments, the coffee capsule has a thickness of about 0.5 to about 6 mm. In some embodiments, the coffee capsule has a thickness of about 1 to about 3 mm. In some embodiments, the consumer product comprises a base layer, a polymer layer, and/or a coating layer. In some embodiments, the base layer comprises pulp fiber, nanofibrillated cellulose (NFC), hairly fiber, or any combination thereof. In some embodiments, the pulp fiber is chlorine free. In some embodiments, the base layer further comprises a water-repellent and/or oil-repellant agent. In some embodiments, the polymer layer comprises a natural polymer that is not derived from petroleum. In some embodiments, the polymer layer is a nanocomposite. In some embodiments, the polymer layer further comprises nanoclay. In some embodiments, the nanoclay is exfoliated montmorillonite. In some embodiments, the nanoclay is incorporated into a polymer matrix. In some embodiments, the coating layer comprises NFC, hairly fiber, pulp fiber, or any combination thereof.

In some aspects, provided herein is a method of making a material, comprising mixing a pulp with a fibrillated cellulose, wherein the pulp and the fibrillated cellulose are independently from a plant fiber. In some embodiments, the method further comprises making fibrillated cellulose by passing the plant fiber through a homogenizer. In some embodiments, the homogenizer generates a pressure of about 1-100 MPa. In some embodiments, the number of the passes is about 2-100. In some embodiments, the mixing is conducted in water. In some embodiments, the method further comprises co-filtration. In some embodiments, the method further comprises a layer by layer filtration, wherein a layer of the pulp or the fibrillated cellulose is filtered on top of a layer of the fibrillated cellulose or the pulp. In some embodiments, the method further comprises consolidating the material. In some embodiments, the method further comprises drying the material. In some embodiments, the drying comprises placing the material between absorbent materials. In some embodiments, the method comprises drying the material at a temperature of 30-50° C. In some embodiments, the method comprises drying the material at a temperature of 50-70° C. In some embodiments, the method comprises drying the material at a temperature of 70-90° C.

In some aspects, provided herein is a method of making a composite, comprising impregnating a liquid resin to a material disclosed herein. In some embodiments, the liquid resin is soybean oil, linseed oil or BIOCOAT. In some embodiments, the method further comprises curing the impregnated material.

In some aspects, provided herein is a method of making a composite, comprising mixing plant cellulose, fibrillated cellulose, and an additional polymer in a suspension. In some embodiments, the additional polymer is polylactic acid, thermoplastic starch, bio-derived polyethylene, or bio-derived polypropylene. In some embodiments, the method comprises applying heat to consolidate the composite. In some embodiments, the method comprises drying the composite. In some embodiments, the additional polymer is in a form of fiber. In some embodiments, the additional polymer is in a form of powder.

In some aspects, provided herein is a method of making a composite, comprising layering a material of any preceding claim, a lamination, and a polymer film. In some embodiments, the lamination comprises polysiloxane. In some embodiments, the lamination comprises petroleum-derived wax. In some embodiments, the polymer film comprises polylactic acid, bio-derived polyethylene, or bio-derived polypropylene. In some embodiments, the polymer film is produced by a micro-compounder equipped with a slit die. In some embodiments, the layering comprises consolidating the composite. In some embodiments, the consolidating is conducted at a temperature of about 50-200° C. In some embodiments, the consolidating is conducted at a temperature of about 120° C. In some embodiments, the consolidating is conducted at a pressure of about 1-5 t weight. In some embodiments, the consolidating is conducted at a pressure of about 1.5 t weight.

The present disclosure also provides a method for manufacturing a consumer product, comprising making an article with a pulp moulding machine. In some embodiments, the method further comprises encapsulating the article by vacuum forming. In some embodiments, the method further comprises coating a polymer layer to a surface of the article by vacuum forming, infrared heating, and/or ultrasonic heating. In some embodiments, the method further comprises adhering the articles to each other by heating the polymer layer by infra-heating or ultrasonic heating. In some embodiments, the method further comprises dip coating the article with a layer of NFC, hairly fiber, natural pulp fiber, or any combination thereof. In some embodiments, the consumer product is a coffee capsule, and wherein the article is a capsule main body and/or a capsule lid.

BRIEF DESCRIPTION OF THE DRAWINGS

FIG. 2 is a table showing characterization results of refined bagasse fibers and their preforms.

FIGS. 4a to 4e are schematic diagrams showing the process of making NFC enhanced paper preforms with different structures.

FIG. 5 is a table showing comparison of baseline bagasse, NFC, and NFC-enhanced paper preforms with different structures.

DETAILED DESCRIPTION

Figure 1:
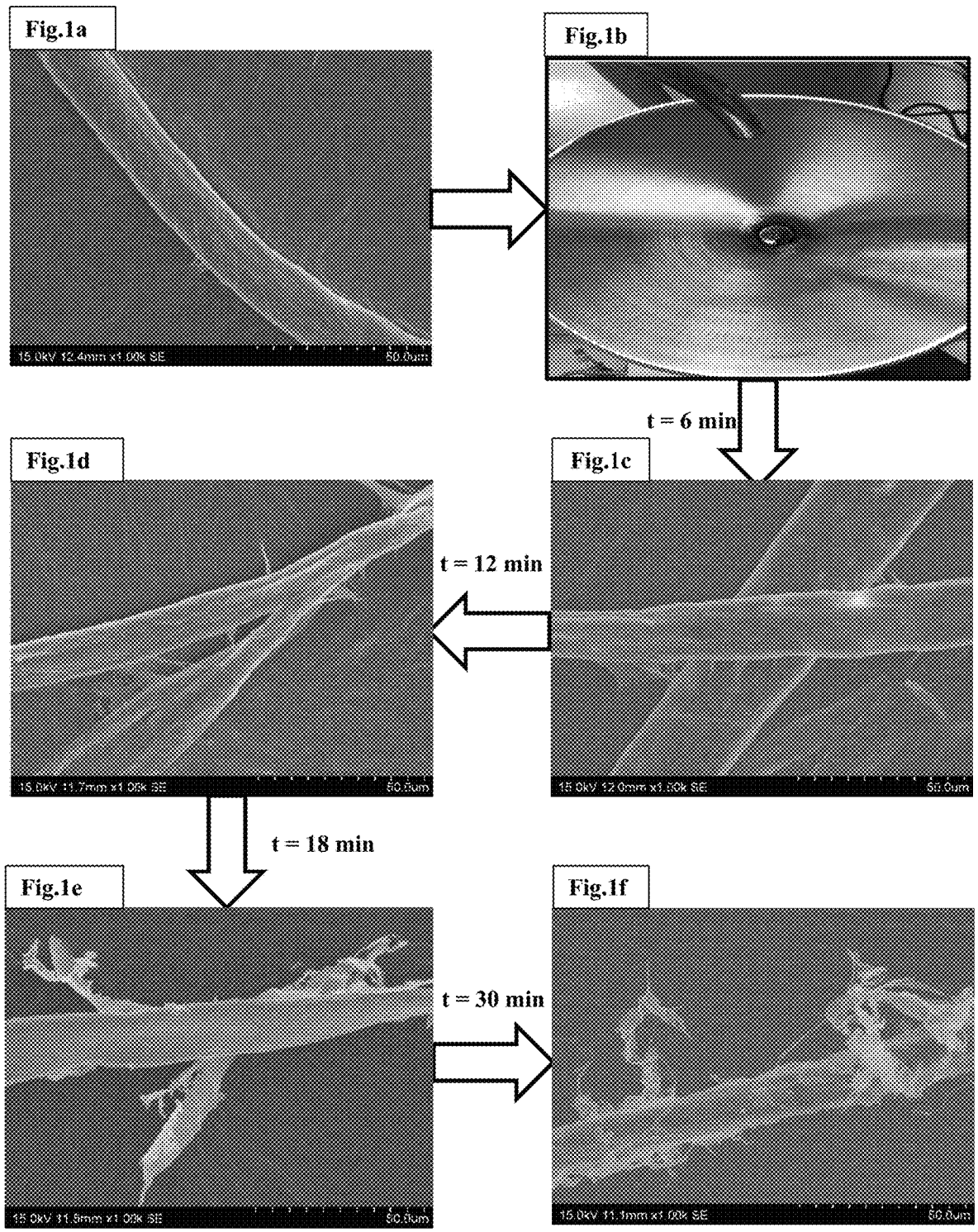
FIGS. 1a to 1f are scanning electron microscope (SEM) images showing bagasse fiber as a function of refining time.

The details of one or more inventive embodiments are set forth in the accompanying drawings, the claims, and the description herein. Other features, objects, and advantages of the inventive embodiments disclosed and contemplated herein can be combined with any other embodiment unless explicitly excluded. Unless defined otherwise, all technical and scientific terms used herein have the same meaning as commonly understood by one of the ordinary skill in the art to which this invention belongs. The materials, methods and examples are illustrative only and not limiting.

Unless otherwise indicated, open terms for example "contain," "containing," "include," "including," and the like mean comprising.

The singular forms "a", "an", and "the" are used herein to include plural references unless the context clearly dictates otherwise. Accordingly, unless the contrary is indicated, the numerical parameters set forth in this application are approximations that may vary depending upon the desired properties sought to be obtained by the present invention.

The term "about" refers to a numerical value within ±15% of a referenced numerical value. Unless otherwise indicated, some embodiments herein contemplate numerical ranges. When a numerical range is provided, unless otherwise indicated, the range includes the range endpoints. Unless otherwise indicated, numerical ranges include all values and subranges therein as if explicitly written out.

The term "hairy fiber" refers to plant fibers containing two or more distinct fiber diameters after a fibrillation process. For example, hairy fiber contains two or more fibers with diameters of different scales such as micrometer and nanometer sized fibers. In some embodiments, hairy fiber contains nanosized cellulose fibers attached onto the surface of micrometer sized pulp fiber.

In some of many aspects, the present disclosure provides an environmental friendly, sustainable and cost-effective functional material, a formulation thereof, and a method of making thereof. In some embodiments, the material is paper-based. In some embodiments, the material is suitable for use in food packaging industry. In some embodiments, the material is a composite material. In some embodiments, the material is a composite of bagasse fibers, which is a by-product from the sugarcane industry, combined with (i) micro- or nano-fibrillated cellulose derived from bagasse fibers and/or (ii) various US FDA approved renewable polymers. In some embodiments, the material is semi-permeable to gas and/or liquid. In some embodiments, the material is impermeable to gas and/or liquid. In some embodiments, the method of making is scalable, e.g., manufacture scale. In some embodiments, the method of making employs an environmentally friendly green technology. In some embodiments, the material is suitable for use in food storage, transportation, cooking vessel and food serving. In some embodiments, the material is resistant to heat, oil, grease, water, or any combination thereof. In some embodiments, the material has reduced permeability compared to conventional fiber or derived paper. In some embodiments, the material is used for biodegradable, heat-, water- and oil-resistant paper-based cup noodle containers. In some embodiments, the material is impermeable to air and moisture. In some embodiments, the material is used for air- and moisture-impermeable coffee capsules. In some embodiments, the material is used for microwavable composite food containers for long-term food storage. In some embodiments, the material preserves the quality and safety of content therein, e.g., food. In some embodiments, the material is suitable for use in instant noodle cups, food trays and coffee capsules. In addition to renewability as the raw material for papers (e.g., cellulose) is bio-sourced, it also serves as a natural carbon sink for the ever-increasing carbon dioxide level in atmosphere.

In some aspects, disclosed herein are formulations of paper-based materials (e.g., preform, composite), and their production methods. In some embodiments, the materials are semi-permeable or impermeable. In some embodiments, the materials possess the required heat-, oil- and/or water-resistance. In some embodiments, paper-based materials are characterized in terms of thermal, mechanical and viscoelastic properties. In some embodiments, cellulose fibers (e.g., microfibrils, nanofibrils) can be extracted from a plant pulp (e.g., bagasse, sugarcane, flax, wood, or cotton). In some embodiments, the materials and methods disclosed herein are useful for making food containers or packaging applications e.g., instant noodle cups and coffee capsules. In some embodiments, the materials and making process can be scaled up to produce large quantities of these food containers/packages.

In some aspects, a method of making a material disclosed herein comprises producing micro- or nano-fibrillated fibers (e.g., bagasse fibers). In some embodiments, provide herein is a method for making composite materials semi-permeable or impermeable to heat, gas, and/or liquid. In some embodiments, the micro- or nano-fibrillated fibers are prepared by passing fibers through a grinder and/or homogenizer. In some embodiments, the micro- or nano-fibrillated fibers blocks the existing pores in conventional fiber-based paper structures, hereby known as "hierarchical" fiber preforms.

In some aspects, also provided herein are methods for producing composites, e.g., impermeable paper-based materials, by combining the aforementioned produced "hierarchical" preforms with thermoplastic or thermosetting resins, depending on the application of the product. Three approaches can be taken to produce such composite structures: (i) laminating the preforms with thermoplastic films, thereby creating a sandwich structure, (ii) impregnating the preform with a low viscosity thermosetting resin and (iii) wet powder impregnation of the initial fiber suspensions followed by heat consolidation and drying. In some embodiments, cradle-to-grave lifecycle assessments are conducted to quantify the green credentials of these products.

In some aspects, disclosed herein are knowledge to assess the economic feasibility and green credentials (life cycle assessment LCA) of the production processes and products. In order to ascertain the green credentials of produced MFC/NFC-enhanced fiber-reinforced composite food packaging materials, comprehensive early stage life-cycle assessment of produced composite food containers can be conducted to gauge the potential environmental impact associated with the materials, e.g., composite containers.

LCA requires careful scope and goal definition in order to define objectives, system boundaries and model input parameters. Life-cycle impact assessment can transform these data to values in selected environmental impact categories.

Cellulose Fibers

Cellulose is a linear macromolecule consisting of a repeating unit that comprises of two D-anhydroglucose rings linked by β(1-4) glycosidic bonds. It is the most abundant organic homopolymer on earth. Cellulose fibers have found numerous industrial applications; in the pharmaceutical and cosmetic industries, the paper industry, and more recently in composites for the production of so-called 'green' (nano) composites. In terms of bio-based packaging, cellulose has also been used in paper form for flexible food packaging. Paper is often used in flexible packaging because it is strong and stiff, printable, can be easily produced, sustainable and cost-effective. A notable example of paper-based flexible food packaging is the dehydrated soup pouch. However, paper as a stand-alone substrate has low barrier properties. Instead, paper is often used as part of laminated packaging combining materials with high barrier properties. Flour/sugar bags, for example, consist of polyethylene-laminated paper. Moreover, every food product has optimum moisture content with respect to its stability, texture and flavor. To keep the moisture content at the correct level, papers often have to be laminated with polymers, wax and aluminium foils to prevent the loss or ingress of water vapour and oxidizing agents, such as air. However, the use of paper-based products as structural (dry) food containers for long-term food storage has yet to be achieved as the main structural component of this laminated structure (e.g., paper) does not possess the required strength/stiffness.

In some embodiments, fibers are from animals or plants. In some embodiments, the fiber is extracted from a plant, such as one or more of abaca, bamboo, banana, coir, coconut husk, cotton, flax, henequen, hemp, hop, jute, palm, ramie, or sisal. Natural fibers have a number of advantages including their worldwide availability, high specific strength and modulus, low density, biodegradability, and renewability. In some embodiments, natural fibers such as plant fibers are used for reinforced polymers, e.g., in composite materials. In some embodiments, methods to render natural fibers more hydrophobic (thereby improving the compatibility between hydrophilic natural fibers and hydrophobic polymer matrices) have included silylation (Mehta G, Drzal L T, Mohanty A K, Misra M. J Appl Polym Sci. 2006; 99(3):1055-1068; Ganan P, Garbizu S, Llano-Ponte R, Mondragon I. Polym Compos. 2005; 26(2): 121-127; Pothan L A, Thomas S, Groeninckx G. Compos Pt A-Appl Sci Manuf 2006; 37(9): 1260-1269; and Valadez-Gonzalez A, Cervantes-Uc J M, Olayo R, Herrera-Franco P J. Compos Pt B-Eng. 1999; 30(3):321-331), acetylation (Tserki V, Zafeiropoulos N E, Simon F, Panayiotou C. Compos Pt A-Appl Sci Manuf. 2005; 36(8):1110-1118), benzoylation (Nair K C M, Thomas S, Groeninckx G. Compos Sci Technol. 2001; 61(16):2519-2529), maleated coupling agents (Mishra S, Naik J B, Patil Y P. Compos Sci Technol. 2000; 60(9):1729-1735), isocyanate treatment (George J, Janardhan R, Anand J S, Bhagawan S S, Thomas S. Polymer. 1996; 37(24):5421-5431) and polymer grafting of natural fibers (Kaith B S, Kalia S. Express Polym Lett. 2008; 2(2):93-100).

In some embodiments, micrometer-scale and nanometer-scale cellulose fibers, called micro-fibrillated cellulose (MFC) and nano-fibrillated cellulose (NFC) respectively, can be produced by fibrillation of micrometer-sized cellulose fibers, either by passing a pulp solution through a high-pressure homogenizer or grinders. These MFC and NFC have excellent mechanical properties in its paper form, with a measured tensile modulus and strength of up to 15 GPa and 232 MPa, respectively (5 times the tensile strength of normal papers) and high gas barrier properties. This can be a result of the fibrillation process, which liberates the otherwise not accessible hydroxyl groups within the cellulose fibers. As a result, they can bind more strongly with like fibers via the formation of hydrogen bonds. In some embodiments, NFC can bind to pulp fibers, producing a nanocellulose-enhanced, pulp fiber-reinforced all-cellulose (nano) composites. In some embodiments, the packing efficiency of fibers (e.g., bagasse fibers) can affect the gas permeability of the formed sheet. In order to increase the packing efficiency of between the fibers, it can be envisaged that NFC could also be used not only to bind pulp fibers during the preform making process but also fill in the gaps present in pulp fiber network, improving the gas barrier properties of the resulting paper-based product. In some embodiments, these shorter and smaller cellulosic fibers can block the pores that naturally exist on fiber surfaces as well as the gaps between fibers, and/or can reduce the gas/liquid permeability of the fiber sheet formed. The porous nature of the larger cellulosic fibers can also aid thermal insulation of the resulting end product as air is a natural thermal insulator. To further produce impermeable paper-based materials, the existing hierarchical paper-based structures are impregnated with FDA approved polymer resins using conventional resin transfer molding. The polymers should render the overall structure impermeable to gases and liquids.

In some embodiments, nanocellulose disclosed herein is isolated nanocellulose, e.g., where the nanocellulose is bacterial cellulose, the support material is contacted with an aqueous dispersion of bacterial cellulose in the absence of a cellulose producing microorganism. In some embodiments, the nanocellulose is extracted, isolated and/or purified prior to the formation of the aqueous nanocellulose dispersion. In some embodiments, nanocellulose is crystalline cellulose with at least one dimension (e.g., height, length or depth) smaller than 100 nm. The source of the nanocellulose is not limited. In some embodiments, the nanocellulose is extracted from a plant, such as wood pulp or cotton or can be extracted from an animal such as tunicate. Alternatively, cellulose can be produced by bacteria. The nanocellulose can be provided as nanofibrillated cellulose, cellulose nanowhiskers or bacterial cellulose. In some embodiments, nanocellulose herein can be purified prior to its contact with the support material. Where the nanocellulose is bacterial cellulose, the bacteria cellulose can be purified by treatment with basic conditions to remove all microorganisms. Alternatively, the cellulose can be purified by centrifugation. In some embodiments, nanocellulose herein can be extracted from a source thereof for example food stuff such as Nata-de-coco or can be isolated from a bacterial culture of a cellulose producing microorganism. Examples of such a cellulose producing micro-organism include micro-organisms belonging to the genera, *Acetobacter, Rhizobium, Alcaligenes, Agrobacterium*, Sarcina and/or *Pseudomonas*. The micro-organism can be a strain adapted to culture in agitated conditions, such as *Acetobacter xylinum* BPR2001. Cellulose whiskers called tunicin can also be extracted from tunicate, a sea animal. In some embodiments, bacterial cellulose or nanocellulose can be produced by specific bacteria strains, the most efficient producer being *Acetobacter xylinum*.

In some aspects, disclosed herein are methods of producing micro- and/or nano-fibrillated (or any cellulosic) fibers (e.g., bagasse fibers). In some embodiments, fibers (e.g., bagasse fibers) are refined, e.g., by a colloid mill. In some embodiments, commercially available dissolving pulp derived from the fibers is used as starting material for making refined fiber preforms. In some embodiments, a dissolving pulp consists of about 90-99 wt. % (e.g., 97.7 wt. %) of cellulose and about 1-10 wt. % (e.g., 2.3 wt. %) hemicellulose, e.g., shown in a carbohydrate analysis. In some embodiments, fiber-derived dissolving pulp is refined using a recirculating colloid mill (e.g., JM-60, Bean Product Machinery, Tiangang Machine Manufacture Co. Ltd., WHERE, China). In some embodiments, the colloid mill is operated at maximum power, e.g., of 1.5 kW.

In some embodiments, prior to milling, fiber-derived dissolving pulp is soaked in water overnight and blended (e.g., at a consistency of 7 g $L^{-1}$) to produce a homogenous fiber suspension. In some embodiments, fiber suspensions are fed into a colloid mill for refinement at about: 6, 12, 18, 30, 45, 60, 90, 120, 150, 180, 240, 300, or 360 minutes.

In some embodiments, fiber preforms are produced using a papermaking process, whereby the previously (refined) fiber suspension (e.g., at a consistency of 7 g $L^{-1}$) is vacuum filtered onto a filter paper (e.g., 18 cm in diameter) to remove the excess water. In some embodiments, the wet filter cake is heat pressed at a weight and temperature, e.g., 1.5 t and 120° C., respectively, for 1-5 hours (e.g., 2 hours) to consolidate and dry the wet filter cake to produce rigid fiber preform. In some embodiments, the fiber preforms possess a grammage of about 400-800 g $m^{-2}$ (e.g., 600 g $m^{-2}$) and a thickness about 1-5 mm (e.g., 2 mm).

In some embodiments, nanocellulose herein has an average diameter of from about 0.1 to 100 nm, about 0.5 to 50 nm, about 1 to 20 nm, or about 1 to 10 nm, for example about: 1, 2, 3, 4, 5, 6, 7, 8, 9, 10, 15, 20, 25, 30, 35, 40, 45, 50, 55, 60, 65, 70, 75, 80, 85, 90, 95, or 100 nm. In some embodiments, the cellulose is provided as a nanofiber having an average thickness of from about 0.5 to 50 nm, about 1 to 20 nm, or about 1 to 10 nm, for example about: 1, 2, 3, 4, 5, 6, 7, 8, 9 or 10 nm. In some embodiments, the cellulose fiber has an average width of from about: 0.5 to 100 nm, 1 to 50 nm, or 5 to 20 nm. In some embodiments, the cellulose fiber has an average length of about: 0.5 to 1000 micrometers, 1 to 500 micrometers, 1 to 100 micrometers, 1 to 50 micrometers, 1 to 20 micrometers, 1 to 10 micrometers, 1 to 5 micrometers, 0.1 to 10 micrometers, or 0.1 to 5 micrometers. In some embodiment, the cellulose is produced as a nanofiber, such as a ribbon shaped nanofibril.

In some embodiments, nanocellulose herein is provided in the form of an aqueous dispersion, suspension or a slurry. In some embodiments, the majority of the nanocellulose does not dissolve in the aqueous solution. The dispersion can be prepared by mixing the nanocellulose with an aqueous solution, for example water. The nanocellulose can be mixed with the water by agitation, for example by stirring, sonication, colloid milling, grinding or homogenization. In some embodiments, a support herein is contacted with an aqueous dispersion of nanocellulose, e.g., the support is immersed or dipped in the aqueous dispersion of nanocellulose (e.g., by slurry dipping). The support is brought into contact with the aqueous dispersion of nanocellulose at room temperature for a period of from 1 to 2 hours, to 7 days, for example from 1 to 7 days, such as 2 to 5 days, or 3 days. The time required to allow coating of the support depends on the hydrophilicity and/or water uptake of the support. In some embodiments, the minimum amount of time required is the time required to obtain maximum moisture saturation of the support when immersed in water.

In some embodiments, a support herein is provided as a polymer. In some embodiments, the support can be provided as a pellet, a powder, loose fibers, a woven or non-woven fiber mat, a string or a tow. In some embodiments, the polymer is a reinforcement component or matrix component, e.g., for the manufacture of composite materials. For example, the support is a hydrophilic support. In some embodiments, the support is provided in the form of a fiber, pellet or a powder, more as a fiber. The polymer can be a synthetic polymer or a naturally derived or occurring polymer. In particular, the polymer may be a naturally occurring fiber or a synthetic polymer based fiber. In some embodiments, the polymer is a hydrophilic polymer (e.g., the polymer provides hydrogen-bonding sites). In some embodiments, the polymer can be a synthetic bioderived polymer such as poly(lactic acid) (PLA), polyhydroxyalkanoate (PHA), bacterial polyesters or synthetic, semi-synthetic or modified cellulose polymers such as cellulose acetate butyrate (CAB), cellulose butyrate, polypropylene (PP), polystyrene (PS), polymethylmetharylate (PMMA), acrylated epoxidised soybean oil (AESO), epoxidised linseed oil, Lyocell, or rayon. In some embodiments, the polymer can be a naturally occurring polymer such as wheat gluten, corn zein, wool, cellulose or starch. The fiber can be derived or obtained from a plant or animal. In particular, the fiber is extracted from a plant, such as one or more of abaca, bamboo, banana, coir, coconut husk, cotton, flax, henequen, hemp, hop, jute, palm, ramie or sisal.

Materials

In some aspects, provided herein is a material, comprising a pulp and a fibrillated cellulose, wherein the pulp and/or fibrillated cellulose is derived from a plant fiber. In some embodiments, the plant fiber is selected from the group consisting of bagasse, flax, hemp, palm, and any combination thereof. In some embodiments, the plant fiber comprises bagasse. In some embodiments, the fibrillated cellulose comprises micro-fibrillated cellulose. In some embodiments, the fibrillated cellulose comprises nano-fibrillated cellulose. In some embodiments, the fibrillated cellulose and the pulp are present in a weight ratio of (1:100 to 1:1), (1:90 to 1:50), (1:80 to 1:60), (1:70 to 1:50), (1:60 to 1:40), (1:50 to 1:30), (1:50 to 1:5), (1:40 to 1:5), (1:30 to 1:1), (1:20 to 1:1), or (1:10 to 1:1), e.g., about 1 to (1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100). In some embodiments, the pulp and the fibrillated cellulose are present in a weight ratio of about 1 to (1, 2, 3, 4, 5, 6, 7, 8, 9, 10, 11, 12, 13, 14, 15, 16, 17, 18, 19, or 20). In some embodiments, the fibrillated cellulose has an average diameter less than about 100 nm, for example, less than about: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 nm. In some embodiments, the material has an average diameter of about: 1-100, 1-90, 1-80, 1-70, 1-60, 1-50, 1-40, 1-30, 1-25, 1-20, or 1-10 µm, or about 15 µm or less, e.g., about 5 µm or less. In some embodiments, the material has an envelope density of no less than about: 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5 5.6, 5.7, 5.8, 5.9, 6, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or 10 g/cm$^3$. In some embodiments, the material has an envelope density of about 0.9 g/cm$^3$ or higher, e.g., about 1.2 g/cm$^3$ or higher. In some embodiments, the material has a porosity of no higher than about: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 percent (%). In some embodiments, the material has a porosity of about: 1 to 50%, 1 to 40%, 1 to 30%, 1 to 25%, 1 to 20%, 1 to 15%, 1 to 10%, 1 to 5%, 1 to 2.5%, or about 48% or less, e.g., about 30% or less. In some embodiments, the material has a Gurley time of longer than about: 100, 200, 300, 400, 500, 750, 1000, 1250, 1500, 2000, 2500, 3000, 5000, 10000, 15000, 20000, 25000, 30000, 35000, 40000, 45000, or 50000 seconds. In some embodiments, the material has a Gurley time of about 260 seconds or longer, e.g., longer than about 38,000 seconds. In some embodiments, the material has an air permeance of no higher than about: (0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.5, 0.6, 0.7, 0.8, 0.9, 1, 2, 3, 4, 5, 6, 7, 8, 9, or 10)×10−7 m$^3$ Pa$^{-1}$ m$^{-2}$ s$^{-1}$. In some embodiments, the material has an air permeance of about 5×10$^{-7}$ m$^3$ Pa$^{-1}$ m 2 s−1 or less, e.g., less than 0.03×10$^{-7}$ m$^3$ Pa$^{-1}$ m$^{-2}$ s$^{-1}$ or less. In some embodiments, the material has an oxygen transmission rate (OTR) of no higher than about: 20000, 15000, 10000, 9000, 8000, 7000, 6000, 5000, 4000, 3000, 2000, 1000, 900, 800, 700, 600, 500, 400, 300, 200, 190, 180, 170, 160, 150, 140, 130, 120, 110, 100, 90, 80, 70, 60, 50, 40, 30, 20, or 10 cm$^3$ m$^{-2}$ d$^{-1}$ (or cm$^3$/(m$^2$ 24 h·atm), or cm$^3$/(m$^2$ 24 h·Mpa)). In some embodiments, the material has an OTR of about 10000 cm$^3$ m$^{-2}$ d$^{-1}$ or less, e.g., about 4000 cm$^3$ m$^{-2}$ d$^{-1}$ or less. In some embodiments, the material has a water vapour transmission rate (WVTR) of no higher than about: 10, 20, 30, 40, 50, 60, 70, 80, 90, 100, 110, 120, 130, 140, 150, 160, 170, 180, 190, 200, 210, 215, 220, 225, 230, 235, 240, 245, 250, 255, 260, 265, 270, 275, 280, 285, 290, 295, 300, 320, 340, 360, 380, 400, 450, 500, 600, 700, 800, 900, or 1000 g m$^{-2}$ d$^{-1}$ (or g/(m$^2$ 24 h)). In some embodiments, the material has a WVTR of about 260 g m$^{-2}$ d$^{-1}$ or less, e.g., about 215 g m$^{-2}$ d$^{-1}$ or less. In some embodiments, the material has a water absorption percentage of no higher than about: 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5 5.6, 5.7, 5.8, 5.9, 6, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or 10 percent (%). In some embodiments, the material has a water absorption percentage of about 5% or less, e.g., about 2% or less. In some embodiments, the material has an oil absorption percentage of less than about: 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5 5.6, 5.7, 5.8, 5.9, 6, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or 10 percent (%), e.g., as measured with castor oil. In some embodiments, the material has an oil absorption percentage of less than 2%, e.g., as measured with castor oil. In some embodiments, the material has no oil absorption. In some embodiments, the material has a tensile modulus of no less than about: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 GPa. In some embodiments, the material has a tensile modulus higher than 4 GPa, e.g., about 8 GPa or higher. In some embodiments, the material has a tensile strength of no less than about: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 215, 220, 225, 230, 235, 240, 245, 250, 255, 260, 265, 270, 275, 280, 285, 290, 295, 300, 320, 340, 360, 380, 400, 450, or 500 MPa. In some embodiments, the material has a tensile strength of about 42 MPa or higher, e.g., about 100 MPa or higher. In some embodiments, the material has a strain-to-failure percentage of about (1, 2, 3, 4, 5, 6, 7, 8, 9, 10, 11, 12, 13, 14, 15, 16, 17, 18, 19, or 20) percent or higher. In some embodiments, the material has a strain-to-failure percentage of about 4% or higher, e.g., about 6% or higher. In some embodiments, the material has a tensile index higher than about: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 215, 220, 225, 230, 235, 240, 245, 250, 255, 260, 265, 270, 275, 280, 285, 290, 295, 300, 320, 340, 360, 380, 400, 450, or 500 N m g$^{-1}$. In some embodiments, the material has a tensile index higher than 50 N m g$^{-1}$, e.g., about 88 N m g$^{-1}$ or higher. In some embodiments, the material has a tensile energy absorption of about (100, 200, 300, 400, 500, 750, 1000, 1250, 1500, 2000, 2500, 3000, 4000, 5000, 600, 7000, 8000, 9000, 10000, 15000, 20000, 25000, 30000, 35000, 40000, 45000, or 50000) mJ m$^{-2}$ or higher. In some embodiments, the material has a tensile energy absorption of about 1800 mJ m$^{-2}$ or higher, e.g., about 5000 mJ m$^{-2}$ or higher. In some embodiments, the material has a flexural modulus 1-100 times higher than that of the plant fiber, e.g., about: 1-100, 1-90, 1-80, 1-70, 1-60, 1-50, 1-40, 1-30, 1-25, 1-20, or 1-10 times higher. In some embodiments, the material has a tensile modulus of about (1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100) times higher than that of the plant fiber. In some embodiments, the material has a tensile strength 1-100 times higher than that of the plant fiber, e.g., about: 1-100, 1-90, 1-80, 1-70, 1-60, 1-50, 1-40, 1-30, 1-25, 1-20, or 1-10 times higher. In some embodiments, the material has a flexural strength of about (1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100) times higher than that of the plant fiber. In some embodiments, the material has a flexural modulus of about (1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100) times higher than that of the plant fiber. In some embodiments, the material has a flexural strength 1-100 times higher than that of the plant fiber, e.g., about: 1-100, 1-90, 1-80, 1-70, 1-60, 1-50, 1-40, 1-30, 1-25, 1-20, or 1-10 times higher. In some embodiments, the material has a flexural strength of about (1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100) times higher than that of the plant fiber. In some embodiments, the material has a storage moduli 1-100 times higher than that of the plant fiber, e.g., about: 1-100, 1-90, 1-80, 1-70, 1-60, 1-50, 1-40, 1-30, 1-25, 1-20, or 1-10 times higher. In some embodiments, the material has a storage moduli of about (1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100) times higher than that of the plant fiber. In some embodiments, a material disclosed herein is semi-permeable to gas (e.g., heated air) and liquid (e.g., water, oil). In some embodiments, a material disclosed herein is impermeable to gas (e.g., heated air) and liquid (e.g., water, oil).

In some aspects, disclosed herein is a support material surface coated with nanocellulose. In some embodiments, the nanocellulose of the coating is orientated perpendicular to the support surface. In some embodiments, the nanocellulose is provided as a dense nanocellulose coating. In some embodiments, the support material is bound together by the nanocellulose. In some embodiments, the nanocellulose is provided as a dense nanocellulose coating. In some embodiments, the nanocellulose is provided as a hairy fiber coating. In some embodiments, production of either a dense nanocellulose coating layer on the surface of the support material or nanocellulose coated hairy fibers, in which the nanocellulose is oriented perpendicular to the surface of the support material, results in an increase in surface area of the support material when compared with the unmodified support material. In some embodiments, surface coated support material is a support material, some or substantially all of the surface of which is coated with nanocellulose. This encompasses a support material coated with a dense and a hairy support. This term is also intended to encompass a support material wherein nanocellulose coats the support material and also acts as a binder to bind support material together. In some embodiments, a surface coated support material encompasses a body comprising support material bound together by nanocellulose. In some embodiments, the surface morphology of a support material (e.g., whether it is coated in hairy fibers or a dense layer) is determined by visually inspecting the surface of the support material, for example by scanning electron microscopy (SEM).

In some embodiments, a dense layer of nanocellulose is a support material coated with nanocellulose, wherein the nanocellulose fibers are sufficiently orientated along the surface of the support material to form a substantially continuous layer. In some embodiments, the dense layer can be composed of nanocellulose fibers stacked or layered on top of one another, where those fibers closest to the support have at least a portion of the longitudinal axis of the fiber in contact with the support. In some embodiments, nanocellulose fibers are stacked or layered on the support contacting fibers to increase the thickness of the dense layer on the support. In some embodiments, nanocellulose fibers are not in contact with the support material. In some embodiments, the support material disclosed herein is coated with nanocellulose, wherein a portion of the coating is in contact with the support surface and wherein the fibers of the portion of the coating in contact with the support surface have at least a part or portion of their longitudinal axis in contact with the support surface. In some embodiments, the support contacting fibers in the dense layer are orientated so that at least a portion of the longitudinal axis of the fibers is in contact with the surface of the support. The fibers can lie entirely in alignment (e.g., in contact) with the surface. In this case, substantially a longitudinal axis of the fibers is in contact with the surface of the support. Alternatively, the fibers can be in contact with the support but not lie entirely in alignment. In this case, a portion of the longitudinal axis of the fiber is in contact with the surface. The fibers are in contact with the support and with each other such that a continuous layer is formed. A dense layer encompasses the provision of the fibers in an extended form and/or where the fibers are folded.

In some embodiments, a hairy fiber or a hairy support is a support material coated with nanocellulose where at least a portion of the nanocellulose is orientated perpendicularly to the surface of the support material. Where nanocellulose of the coating is "orientated perpendicularly", in the context of this disclosure, some, or substantially all, of the nanocellulose, rather than lying in alignment with the surface of the support material, extends at an angle therefrom (this encompasses not only nanocellulose extending at an angle of 90 degrees relative to the surface of the support material, but also encompasses nanocellulose which extends at any angle therefrom, rather than lying entirely in alignment with the surface).

In some aspects, the present disclosure provides a surface coated support material obtainable by the process disclosed herein. In some embodiments, the support can be modified by physical or chemical treatments prior to contact with the nanocellulose, such as atmospheric or low pressure plasma or corona treatments, solvent washing or extraction, bleaching, boiling or washing, for example in a basic solution, such as sodium hydroxide solution. In particular, the support can be washed with a solvent, such as an organic solvent (e.g., acetone, ethyl acetate etc. or an alcohol such as ethanol, methanol, propanol, butanol etc.) prior to exposing the support to an aqueous suspension or slurry of nanocellulose.

Composites

In some aspects, provided herein is a composite, comprising a material (e.g., support material, preform) and an additional polymer (e.g., bio-degradable polymer). In some embodiments, the additional polymer is polylactic acid (polylactide), chitin, chitosan, alginic acid, alginate salt (e.g., sodium alginate, calcium alginate, magnesium alginate, triethanolamine alginate, potassium alginate, strontium alginate, barium alginate, or ammonium alginate), propylene glycol alginate, lignin, thermoplastic starch, polyethylene, polypropylene, polyethylene glycol, polyglycolide, poly(lactide-co-glycolide), polyacrylate, polymethacrylate, poly(8-caprolactone), polyorthoester, polyanhydride, polylysine, polyethyleneimine, carboxymethylcellulose, acetylated carboxymethylcellulose, gelatin, collagen, a derivative thereof, any combination thereof or a copolyrer thereof. In some embodiments, additional polymer is in a form of fiber. In some embodiments, the additional polymer is in a form of powder. The polymer can be a synthetic polymer or a naturally derived or occurring polymer. In particular, the polymer may be a naturally occurring fiber or a synthetic polymer based fiber. In some embodiments, the polymer is a hydrophilic polymer (e.g., the polymer provides hydrogen-bonding sites). In some embodiments, the polymer can be a synthetic bioderived polymer such as poly(lactic acid) (PLA), polyhydroxyalkanoate (PHA), bacterial polyesters or synthetic, semi-synthetic or modified cellulose polymers such as cellulose acetate butyrate (CAB), cellulose butyrate, polypropylene (PP), polystyrene (PS), polymethylmetharylate (PMMA), acrylated epoxidised soybean oil (AESO), epoxidised linseed oil, Lyocell, or rayon. In some embodiments, the polymer can be a naturally occurring polymer such as wheat gluten, corn zein, wool, cellulose or starch. The fiber can be derived or obtained from a plant or animal. In particular, the fiber is extracted from a plant, such as one or more of abaca, bamboo, banana, coir, coconut husk, cotton, flax, henequen, hemp, hop, jute, palm, ramie or sisal.

In some embodiments, the composite has a flexural modulus 1-100 times higher than that of the material or plant fiber, e.g., about: 1-100, 1-90, 1-80, 1-70, 1-60, 1-50, 1-40, 1-30, 1-25, 1-20, or 1-10 times higher. In some embodiments, the composite has a tensile modulus of about (1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100) times higher than that of the material or plant fiber. In some embodiments, the composite has a tensile strength 1-100 times higher than that of the material or plant fiber, e.g., about: 1-100, 1-90, 1-80, 1-70, 1-60, 1-50, 1-40, 1-30, 1-25, 1-20, or 1-10 times higher. In some embodiments, the composite has a flexural strength of about (1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100) times higher than that of the material or plant fiber. In some embodiments, the composite has a flexural modulus of about (1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100) times higher than that of the material or plant fiber. In some embodiments, the composite has a flexural strength 1-100 times higher than that of the material or plant fiber, e.g., about: 1-100, 1-90, 1-80, 1-70, 1-60, 1-50, 1-40, 1-30, 1-25, 1-20, or 1-10 times higher. In some embodiments, the composite has a flexural strength of about (1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100) times higher than that of the material or plant fiber. In some embodiments, the composite has a storage moduli 1-100 times higher than that of the material or plant fiber, e.g., about: 1-100, 1-90, 1-80, 1-70, 1-60, 1-50, 1-40, 1-30, 1-25, 1-20, or 1-10 times higher. In some embodiments, the composite has a storage moduli of about (1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100) times higher than that of the material or plant fiber. In some embodiments, a composite disclosed herein is semi-permeable to gas (e.g., heated air) and liquid (e.g., water, oil). In some embodiments, a composite disclosed herein is impermeable to gas (e.g., heated air) and liquid (e.g., water, oil).

In some embodiments, the composite has an oxygen transmission rate (OTR) of no higher than about: 20000, 15000, 10000, 9000, 8000, 7000, 6000, 5000, 4000, 3000, 2000, 1000, 900, 800, 700, 600, 500, 400, 300, 200, 190, 180, 170, 160, 150, 145, 140, 135, 130, 125, 120, 115, 110, 100, 90, 80, 70, 60, 50, 40, 30, 20, 10, 5, or 1 cm$^3$ m$^{-2}$ d$^{-1}$ (or cm$^3$/(m$^2$ 24 h·atm), or cm$^3$/(m$^2$ 24 h·Mpa)). In some embodiments, the composite has an OTR of about 500 cm$^3$ m$^{-2}$ d$^{-1}$ or less, e.g., about 200 cm$^3$ m$^{-2}$ d$^{-1}$ or less. In some embodiments, the composite has a water vapour transmission rate (WVTR) of no higher than about: 10, 20, 30, 40, 50, 60, 70, 80, 90, 100, 110, 120, 130, 140, 150, 160, 170, 180, 190, 200, 210, 215, 220, 225, 230, 235, 240, 245, 250, 255, 260, 265, 270, 275, 280, 285, 290, 295, 300, 320, 340, 360, 380, 400, 450, 500, 600, 700, 800, 900, or 1000 g m$^{-2}$ d$^{-1}$ (or g/(m$^2$ 24 h)). In some embodiments, the composite has a WVTR of about 200 g m$^{-2}$ d$^{-1}$ or less, e.g., about 100 g m$^{-2}$ d$^{-1}$ or less. In some embodiments, the composite has a water absorption percentage of no higher than about: 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5 5.6, 5.7, 5.8, 5.9, 6, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or 10 percent (%). In some embodiments, the composite has a water absorption percentage of about 5% or less, e.g., about 2% or less. In some embodiments, the composite has an oil absorption percentage of less than about: 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5 5.6, 5.7, 5.8, 5.9, 6, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or 10 percent (%), e.g., as measured with castor oil. In some embodiments, the composite has an oil absorption percentage of less than 2%, e.g., as measured with castor oil. In some embodiments, the composite has no oil absorption. In some embodiments, the composite has a tensile modulus of no less than about: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 GPa. In some embodiments, the composite has a tensile modulus higher than 4 GPa, e.g., about 6 GPa or higher. In some embodiments, the composite has a tensile strength of no less than about: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 215, 220, 225, 230, 235, 240, 245, 250, 255, 260, 265, 270, 275, 280, 285, 290, 295, 300, 320, 340, 360, 380, 400, 450, or 500 MPa. In some embodiments, the composite has a tensile strength of about 50 MPa or higher. In some embodiments, the composite has a strain-to-failure percentage of about (1, 1.5, 2, 2.5, 3, 3.5, 4, 4.5, 5, 6, 7, 8, 9, 10, 11, 12, 13, 14, 15, 16, 17, 18, 19, or 20) percent or higher. In some embodiments, the composite has a strain-to-failure percentage of about 1% or higher, e.g., about 1.5% or higher. In some embodiments, the composite has a tensile index higher than about: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 215, 220, 225, 230, 235, 240, 245, 250, 255, 260, 265, 270, 275, 280, 285, 290, 295, 300, 320, 340, 360, 380, 400, 450, or 500 N m g$^{-1}$. In some embodiments, the composite has a tensile index higher than 50 N m g$^{-1}$, e.g., about 88 N m g$^{-1}$ or higher. In some embodiments, the composite has a tensile energy absorption of about (100, 200, 300, 400, 500, 750, 1000, 1250, 1500, 2000, 2500, 3000, 4000, 5000, 600, 7000, 8000, 9000, 10000, 15000, 20000, 25000, 30000, 35000, 40000, 45000, or 50000) mJ m$^{-2}$ or higher. In some embodiments, the composite has a tensile energy absorption of about 1800 mJ m$^{-2}$ or higher, e.g., about 5000 mJ m$^{-2}$ or higher. In some embodiments, a composite disclosed herein is semi-permeable to gas (e.g., heated air) and liquid (e.g., water, oil). In some embodiments, a composite disclosed herein is impermeable to gas (e.g., heated air) and liquid (e.g., water, oil).

A composite is a structural product made of two or more distinct components. In some embodiments, while each of the components remains physically distinct, composite materials exhibit a synergistic combination of the properties of each component, resulting in a material with extremely favorable and useful characteristics. In some embodiments, composites are composed of a matrix component and a reinforcement component. The reinforcement provides the special mechanical and/or physical properties of the material and is provided as fibers or fragments of material. The matrix surrounds and binds the fibers or fragments together to provide a material which is durable, stable to heat, stable to corrosion, malleable, strong, stiff and light. Composites made with synthetic fillers such as glass or carbon fibers can be extensively used for many applications, such as sport, automotive and aerospace, due to their specific properties based on a strong interaction between the different components and a great stability. In some embodiments, the strength and stiffness of a composite material depend on the strength and stiffness of the reinforcement component and its interaction with the matrix component. Improving the interaction of the reinforcement and the matrix components provides composite materials which are stronger, more durable and less susceptible to stress and wear. In some embodiments, a composite herein is impermeable to heat, gas (e.g., air), and/or water.

In some embodiments, a material obtainable by a process disclosed herein is used as a reinforcing agent for making composites. In some embodiments, the material can be combined with any conventional matrix known to a person skilled in the art. Where the material is biodegradable, in order to preserve the renewability and biodegradability of the material, bioderived polymers such as poly(lactic acid) (PLA), polyhydroxyalkanoates (PHA, bacterial polyesters), polycarbonates, or modified cellulose polymers (cellulose acetate butyrate (CAB) or cellulose butyrate) or cellulose pulp, as well as epoxy resins such as plant based resins (for example acrylated epoxidised soybean oil (AESO) or epoxidised linseed oil) can be used as a matrix. In some embodiments, a surface coated support material disclosed herein is used as a reinforcement for a polylactide, for example poly-L-lactide (PLLA) to create green hierarchical composites. An increased surface area of the surface coated support material increases the surface roughness of the surface coated support material and results in enhanced mechanical interlocking between the fibers and the matrix. The resulting composite exhibits improved mechanical properties, tensile properties, visco-elastic properties and flexural properties of the hierarchical composites compared with neat PLLA.

In some embodiments, a composite material disclosed herein comprises a reinforcement and a matrix, wherein the reinforcement comprises a support material obtainable or obtained by the process disclosed herein. In some embodiments, the composite material is a cellulose nanocomposite. In some embodiments, the matrix comprises cellulose. In some embodiments, the cellulose is dispersed through the matrix. In some embodiments, a composite material disclosed herein comprises a reinforcement and a matrix, wherein the matrix comprises a surface coated support material obtainable or obtained by the process disclosed herein. The matrix comprising the material produced by the process herein can be combined with any conventional reinforcement known to a person skilled in the art. Where the matrix is biodegradable, the reinforcement is also biodegradable.

In some aspects, the present disclosure relates to an article produced from a composite material disclosed herein or a composite material produced by the process disclosed herein. The composite material is particularly provided for use in low-load applications, including but not limited to packaging, or use in the automotive, household, sport and/or construction industries. The article disclosed herein is produced from a fully biodegradable composite material.

Methods of Making Support Materials

In some aspects, provided herein is a method of making a material, comprising making fibrillated cellulose from a plant fiber. In some embodiments, the making comprises passing the plant fiber through a homogenizer. In some embodiments, the homogenizer generates a pressure of about 1-100 MPa. In some embodiments, the number of the passes is about 2-100. In some embodiments, the method further comprises mixing the plant fiber with the fibrillated cellulose. In some embodiments, the mixing is conducted in water. In some embodiments, the method further comprises co-filtration. In some embodiments, the method further comprises consolidating the material. In some embodiments, the method further comprises drying the material. In some embodiments, the drying comprises placing the material between absorbent materials. In some embodiments, the method comprises drying the material at a temperature of 30-50° C. In some embodiments, the method comprises drying the material at a temperature of 50-70° C. In some embodiments, the method comprises drying the material at a temperature of 70-90° C.

In some embodiments, the present disclosure provides a process for producing a material reinforced with microcellulose or nanocellulose. In some embodiments, the material is used a support, or a support preform to creating a composite. In some embodiments, the material is semi-permeable to heat, gas (e.g., air), and/or water. For example, MFC and/or NFC-enhanced fiber preform has desired mechanical performance, reduced oxygen permeability, resistance to water and/or grease.

In some embodiments, MFC and/or NFC fibers (e.g., from bagasse) can be produced with a very broad fiber diameter distribution to enhance the barrier properties of conventional fiber preforms, e.g., thereby producing semi-impermeable hierarchical paper-based materials. In some embodiments, the diameters and diameter distributions of MFC and/or NFC are determined by optimizing the number of passes through the homogenizer and solid content. In some embodiments, MFC and/or NFC is used. This MFC and/or NFC dispersion with broad fiber diameters (e.g., 5-1000 nm) are mixed with fibers in water prior to co-filtration, which are followed by consolidation to produce a fiber preform. In some embodiments, the pores existing in the preform are filled by MFCs and/or NFCs of various dimensions, further enhancing the oxygen and potentially the water-barrier properties of the resulting MFC- and/or NFC-enhanced fiber preforms. The oxygen and water barrier properties are investigated as function of the diameter distribution of the MFC and/or NFC forming a 3-dimensional network surrounding the micrometer sized fibers. In some embodiments, the ionic strength of the dispersion medium is changed to first induce flocculation of the NFC. In some embodiments, the flocculation of NFC can occur at random and non-specific. In some embodiments, the preform is uniform and produced at lower filtration times. In some embodiments, the tensile properties of the NFC-enhanced fiber preforms are quantified as a function of NFC-to-base fiber ratio and relative humidity in accordance to BS ISO 1924 and BS ISO 3781, respectively, to simulate real world applications. The bond strength between the fibers is measured using zero-span test (BS ISO 15361: 2000). As one of the main aims of this project is to produce composite food containers with reduced oxygen permeability the permeability of the produced preforms toward oxygen are quantified (ASTM D1434-82: 2009 or equivalent) and optimized as a function of NFC-to-base fiber ratio. In some embodiments, the MFC and/or NFC-fiber preform with desired oxygen permeability is subjected to further refinement to produce impermeable paper-based composite materials.

In some embodiments, when a support is obtained or derived from a natural source, the support can be biodegradable or reinforced. After immersion of the support, it may be removed from the aqueous dispersion of bacterial cellulose and dried. In one embodiment, the process further comprises the steps of removing the coated support material from the dispersion; and/or optionally drying the support material. The step of removing the coated support material from the dispersion may be achieved by mechanical extraction of the support, for example, by using tweezers. The support material can be dried according to any methods known in the art, for example, air drying, oven drying, freeze drying, drying in vacuum, infra-red irradiation etc. In some embodiments, the method by which the support material is dried can impact on the orientation and arrangement of the bacterial cellulose coating on the support material, and/or can be modified to manipulate the form of the material disclosed herein or produced by a method herein. In some embodiments, surface coated support material is dried with heating. In some embodiments, the support material is dried above room temperature, for example at a temperature of from 50° C. to 150° C., 60° C., 70° C., 80° C., 90° C., 100° C., 110° C., 120° C., 130° C. or 140° C. The drying temperature can be provided as a range of temperatures selected from any of the discrete temperatures set out above, for example 70° C. to 90° C. The drying can be carried in air or under a vacuum. The drying of the support material results in a dense nanocellulose layer on the surface of the material.

In some aspects, the present disclosure provides a process for the production of a surface coated support material, comprising contacting a support material with an aqueous dispersion of nanocellulose; removing the coated support material from the dispersion; and/or drying the support material at 70° C. to 90° C., at 80° C. In some embodiments, the nanocellulose is provided as a bacterial cellulose layer on the surface of the support material. In some embodiments, the bacterial cellulose layer is a dense layer of bacterial cellulose. In a dense layer, the bacterial cellulose may form a layer which substantially covers the support material. In some embodiments, surface coated support material is initially partially dried by layering the support material between two pieces of an absorbent material, such as filter paper. Pressure can be applied to the upper and/or lower piece of absorbent material, for example by the addition of a weight to increase the removal of liquid from the support material. The support material can then be further dried, at a temperature of 30 to 150° C., 40° C., 50° C., 60° C., 70° C., 80° C., 90° C., 100° C., 110° C., 120° C., 130° C. or 140° C. The drying temperature can be provided as a range of temperatures selected from any of the discrete temperatures set out above, for example, 30° C. to 50° C. The drying is carried out in an air oven. This two stage drying method results in the formation of hairy "fibers" or a hairy support, where the nanocellulose is orientated perpendicularly to the surface of the support material.

In some aspects, the present disclosure provides a process for the production of a surface coated support material; comprising contacting a support material with an aqueous dispersion of nanocellulose; removing the coated support material from the dispersion; and/or drying the support material by layering the support material between two pieces of absorbent material followed by drying in an air oven at 30° C. to 50° C., such as at 40° C. In some embodiments, the nanocellulose of the coating is orientated perpendicularly to the support surface. In some embodiments, the method of removing comprises the steps of removing the coated support material from the dispersion; and/or optionally drying the support material, the removing step is carried out by filtration of the dispersion, for example vacuum filtration, or by evaporation, for example under reduced pressure (e.g., under vacuum) and/or heating.

In some embodiments, steps of removing the coated support material from the dispersion and drying the coated support material may be carried out in a single step for example, by evaporation (e.g., by heating and/or under reduced pressure). For example, the dispersion comprising the coated support material may be heated to remove the coated support material from the dispersion by evaporation and to dry the support material.

When the coated support material is removed from the dispersion by filtration, for example, by vacuum filtration, the support material may be bound together by the nanocellulose (e.g., forming a body comprising coated support material bound by the nanocellulose). In embodiments where the coated support material is removed from the dispersion by filtration, the support material may be initially partially dried by layering the support material between two pieces of an absorbent material, such as filter paper. Pressure can be applied to the upper and/or lower piece of absorbent material, for example by the addition of a weight to increase the removal of liquid from the support material. The support material may be further dried, at a temperature of 30 to 150° C., 40° C., 50° C., 60° C., 70° C., 80° C., 90° C., 100° C., 110° C., 120° C., 130° C. or 140° C. The drying temperature can be provided as a range of temperatures selected from any of the discrete temperatures set out above, for example, 50° C. to 70° C.

In some aspects, the present disclosure provides a process for the production of a surface coated support material; comprising contacting a support material with an aqueous dispersion of nanocellulose; removing the coated support material from the dispersion by filtration of the dispersion; drying the support material by layering the support material between two pieces of absorbent material; and/or optionally drying in an air oven at 50° C. to 70° C., such as at 60° C. In some embodiments, the modified material can be stored at room temperature and pressure.

Methods of Making Composites
Impregnating MFC/NFC-Enhanced Fiber Preform with Renewable Polymers In some aspects, provided herein is a method of making a composite, comprising impregnating a liquid resin to a material disclosed herein. In some embodiments, the liquid resin is soybean oil, linseed oil or BIOCOAT. In some embodiments, the method further comprises curing the impregnated material. In other aspects, provided herein is a method of making a composite, comprising mixing plant cellulose, fibrillated cellulose, and an additional polymer in a suspension. In some embodiments, the additional polymer is polylactic acid, thermoplastic starch, bio-derived polyethylene, or bio-derived polypropylene. In some embodiments, the method comprises applying heat to consolidate the composite. In some embodiments, the method comprises drying the composite. In some embodiments, the additional polymer is in a form of fiber. In some embodiments, the additional polymer is in a form of powder.

In some embodiments, MFC and/or NFC-enhanced fiber preforms (e.g., bagasse fiber preform) are impregnated with renewable sourced polymers, thereby creating composites. In some embodiments, in order to keep the green credentials of the resulting product, renewable polymers (polylactic acid, thermoplastic starch and others yet to be identified) are used. Other alternatives include bio-derived polyethylene (bio-PE) and bio-derived polypropylene (bio-PP). Although bio-PE and bio-PP are not biodegradable, these polymers are known to have excellent barrier properties and could be used either as a model system for comparison, or as a first step towards the realization of truly green food storage containers.

Two possible routes are to impregnate the produced NFC-enhanced fiber preform with polymers. Firstly, the MFC and/or NFC-enhanced fiber preform is first produced, followed by post impregnation with a low viscosity liquid monomer (such as soybean oil, linseed oil or BIOCOAT), followed by a curing step. In the second approach, polymers (in powder or fiber) are dispersed together with MFC/NFC and natural base fibers. The resulting suspension is then filtered following a procedure disclosed herein, followed by a consolidation and drying to produce a composite in a single step. The actual composite food storage container is then simply produced by raising the temperature under pressure further to melt the polymer matrix to impregnate and consolidate the composite. The first approach has the advantage of ease of preform making. The second approach has the advantage of producing composite in a single step. MFC/NFC-enhanced fiber-reinforced composites are produced as efficient as possible (e.g., with the least complexity and number of making steps). The moisture uptake and oxygen permeability of the produced composites are quantified. The amount of polymers/monomers in the making step can be optimized to reduce the amount of polymers/monomers needed whilst keeping the required mechanical performance, reduced moisture update and oxygen permeability. The oxygen permeability is measured in accordance to methodology disclosed herein or in accordance to ASTM D1434-82: 2009 or equivalent. In order to quantify moisture uptake, dynamic vapour sorption are used. The water vapour transmission rate and grease resistance can be measured in accordance to ASTM E96/E96M-12 and TAPPI 454, respectively. In addition to this, any deformation of the composites after exposure to moisture is undesirable. In some embodiments, the dimensional stability of the composite containers after moisture exposure is studied using thermomechanical analysis (TMA). In some embodiments, there is a correlation between the morphology and water permeability of the material. The results can be correlated with the mechanical performance as a function of relative humidity/moisture content.

Developing MFC/NFC-Enhanced Fiber Preform Polymer Laminates

In some aspects, provided herein is a method of making a composite, comprising layering a material of any preceding claim, a lamination, and a polymer film. In some embodiments, the lamination comprises polysiloxane. In some embodiments, the lamination comprises petroleum-derived wax. In some embodiments, the polymer film comprises polylactic acid, bio-derived polyethylene, or bio-derived polypropylene. In some embodiments, the polymer film is produced by a micro-compounder equipped with a slit die. In some embodiments, the layering comprises consolidating the composite. In some embodiments, the consolidating is conducted at a temperature of about 50-200° C. In some embodiments, the consolidating is conducted at a temperature of about 120° C. In some embodiments, the consolidating is conducted at a pressure of about 1-5 t weight. In some embodiments, the consolidating is conducted at a pressure of about 1.5 t weight.

In some embodiments, thin polymer films can be laminated onto the MFC/NFC-enhanced fiber preforms, thereby creating a sandwich structure. In some embodiments, renewable thermoplastic include poly(lactic acid), bio-based polypropylene or polyethylene. To produce thermoplastic polymer laminated MFC/NFC-enhanced fiber preforms, a MFC/NFC-enhanced fiber preform is first produced, followed by the lamination of a suitable thermoplastic film onto the preform. This can be achieved by heat consolidation of thermoplastic films onto the MFC/NFC-enhanced fiber preform. In some embodiments, thin polymer films can be produced by film line extrusion method. In some embodiments, DSM micro-compounder equipped with a slit die can also be used to produce these films. Optimum making parameters, including consolidation pressure and temperature, are identified. In some embodiments, plasma treatments of the thermoplastic film are performed to introduce (water-stable) hydrophobic moieties onto the thermoplastic film.

Composites with Surface Coated Preforms

In some aspects, the present disclosure relates to a process for the production of a composite material, wherein a reinforcement comprising the surface coated support material herein is impregnated, mixed, or extruded with a matrix, such as a polymer or a resin. In certain embodiments, the surface coated support material is a surface coated support material wherein the support material is bound together by nanocellulose. The composite can be produced using any suitable process such as resin transfer molding, sheet molding, resin infusion molding, or by powder impregnation, injection molding and compression molding. For example, the surface coated support material may be impregnated with a resin, such as acrylated epoxidised soybean oil (AESO) or epoxidised linseed oil and then cured, for example, by heating, optionally in the presence of an initiating species. In another example, the surface coated support material may be dispersed in a solution of a polymer, such as PLA, after which the solvent may be removed. Alternatively, the surface coated support material may be impregnated, mixed, or extruded with a polymer powder or a polymer fiber, a thermoplastic polymer, allowing the composite material to be heat formed or consolidated into a desired shape.

In some aspects, the present disclosure relates to a process for the production of a composite material comprising a reinforcement and a matrix, wherein the reinforcement comprises a surface coated support material, wherein the composite material is produced by: contacting a support material with an aqueous dispersion of nanocellulose, wherein the aqueous dispersion of nanocellulose further comprises a matrix material; removing the composite material from the dispersion by filtration, vacuum filtration; and/or optionally drying the composite material. In some embodiments, the matrix material is dispersed in the aqueous dispersion of nanocellulose. In other embodiments, the matrix material is a polymer, a thermoplastic polymer. In another embodiment, the matrix material is a polymer powder or a polymer fiber. The matrix material may be a matrix as described herein. The composite materials produced by this method may subsequently be molded into a desired shape, for example by compression molding or hot pressing. The support material and the drying step may be as described herein.

Consumer Products

In some aspect, provided herein is a consumer product, e.g., made by the material or composite disclosed herein, or a method of manufacturing a consumer product. In some embodiments, the consumer product is a motor vehicle, a home or office appliance, an electronic device, home or office furniture, or a children's product. A "children's product" as a consumer product is designed or intended primarily for children 12 years of age or younger.

In some embodiments, a consumer product disclosed herein is in a solid form. In some embodiments, the consumer product is a small object. In some embodiments, the consumer product is selected from the group consisting of: trash bags, food wrap, dental floss, wipes, electronic components, wall paper, clothing, aprons, window coverings, placemats, and book covers. In some embodiments, the consumer product is a sheet, bag, container, plate, or tray. In some embodiments, the consumer product is a food serving vehicle, or a food package. In some embodiments, the consumer product is a container. In some embodiments, the consumer product is a coffee capsule. In some embodiments, the consumer product is an instant noodle cup.

In some aspects, provided herein is a use of a material or composite disclosed herein for the manufacture of a consumer product. In some embodiments, the consumer product is a motor vehicle, a home or office appliance, an electronic device, home or office furniture, or a baby or kid product. In some embodiments, the consumer product is a small object. In some embodiments, the consumer product is a sheet, bag, container, plate, or tray. In some embodiments, the consumer product is a food serving vehicle. In some embodiments, the consumer product is a food package. In some embodiments, the consumer product is a coffee capsule. In some embodiments, the consumer product is an instant noodle cup.

EXAMPLES

Example 1. Refining Bagasse Fibers Using a Colloid Mill to Produce Hairy Fibers

Batch 1

Commercially available dissolving pulp derived from bagasse fibers was used as starting material for making refined bagasse fiber preforms. Carbohydrate analysis showed that this dissolving pulp consists of 97.7 wt.-% of cellulose and 2.3 wt.-% hemicellulose. Bagasse fiber-derived dissolving pulp was refined using a recirculating colloid mill (JM-60, Bean Product Machinery, Tiangang Machine Manufacture Co. Ltd., WHERE, China). The colloid mill was operated at maximum power of 1.5 kW. Prior to milling, the bagasse fiber-derived dissolving pulp was soaked in water overnight and blended at a consistency of 7 g L−1 to produce a homogenous fiber suspension. The fiber suspensions were fed into the colloid mill for refinement at 6, 12, 18 and 30 min, respectively.

Bagasse fiber preforms were produced using a papermaking process, whereby the previously (refined) fiber suspension (at a consistency of 7 g L) was vacuum filtered onto a filter paper (18 cm in diameter) to remove the excess water. The wet filter cake was then heat pressed at a weight and temperature of 1.5 t and 120° C., respectively, for 2 h to consolidate and dry the wet filter cake to produce rigid bagasse fiber preform. The bagasse fiber preforms possess a grammage of 600 g m$^{-2}$ and a thickness ~2 mm. The preforms produced from bagasse fibers refined at 0, 6, 12, 18 and 30 min are herein termed P0, P6, P12, P18 and P30, respectively.

TABLE 1

Fiber diameter (d) of the (refined) pulp and the envelope density (ρ), porosity (P), Gurley time and air permeance of the produced (refined) bagasse fiber preforms

| Sample | d (μm) | ρ (g cm$^{-3}$) | P (%) | Gurley time (s) | Air permeance (10$^{-7}$ m$^3$ Pa$^{-1}$ m$^{-2}$ s$^{-1}$) |
|---|---|---|---|---|---|
| P0  | 20 ± 2 | 0.81 ± 0.02 | 51 ± 1 | 17 ± 2 | 312.4 ± 36.5 |
| P6  | 13 ± 2 | 0.86 ± 0.04 | 48 ± 3 | 263 ± 2 | 4.9 ± 0 |
| P12 | 9 ± 2  | 0.95 ± 0.02 | 43 ± 1 | 1440 ± 192 | 0.9 ± 0.1 |
| P18 | 7 ± 3  | 1.11 ± 0.02 | 33 ± 1 | >38000 | <0.03 |
| P30 | 5 ± 2  | 1.16 ± 0.03 | 30 ± 2 | >38000 | <0.03 |

TABLE 2

The oxygen transmission rate (OTR), water vapour transmission rate (WVTR), percentage volume of water and oil droplets wicked into the (refined) bagasse fiber preforms after 60 s.

| Sample | OTR (cm$^3$ m$^{-2}$ d$^{-1}$) | WVTR (g m$^{-2}$ d$^{-1}$) | Water absorbed (%) | Castor oil absorbed (%) |
|---|---|---|---|---|
| P0 | >100000 | 343 | 34 ± 4 | 2 ± 1 |
| P6 | >100000 | 258 | 41 ± 6 | 0 |
| P12 | >100000 | 243 | 5 ± 1 | 0 |
| P18 | 10000 | 215 | 2 ± 1 | 0 |
| P30 | 4000 | 247 | 2 ± 0 | 0 |

TABLE 3

Tensile properties of (refined) bagasse fiber preforms. E, σ, ε, $\sigma^T$ and $\sigma^E$ denote the tensile modulus, tensile strength, strain-to-failure, tensile index and tensile energy absorption of the (refined) bagasse fiber preforms, respectively.

| Sample | E (GPa) | σ (MPa) | ε (%) | $\sigma^T$ (N m g$^{-1}$) | $\sigma^E$ (mJ m$^{-2}$) |
|---|---|---|---|---|---|
| P0 | 3.9 ± 0.2 | 34.9 ± 0.7 | 2.1 ± 0.3 | 45 ± 2 | 789 ± 149 |
| P6 | 4.2 ± 0.2 | 41.7 ± 1.6 | 4.0 ± 0.4 | 49 ± 2 | 1752 ± 216 |
| P12 | 4.7 ± 0.2 | 55.1 ± 2.2 | 4.8 ± 0.9 | 64 ± 3 | 2883 ± 721 |
| P18 | 6.1 ± 0.1 | 72.3 ± 1.2 | 4.9 ± 0.7 | 69 ± 1 | 3248 ± 519 |
| P30 | 8.3 ± 0.5 | 100.1 ± 5.0 | 5.6 ± 1.2 | 88 ± 3 | 4815 ± 949 |

FIG. 1e to FIG. 1f show SEM images of bagasse fibers as a function of refining time. (1a) neat bagasse, (1b) colloid mill, (1c) 6 min refined bagasse, (1d) 12 min refined bagasse, (1e) 18 min refined bagasse, and (1f) 30 min refined bagasse, respectively.

Batch 2

Bagasse fiber-derived dissolving pulp (0.7 wt. %) was refined using a recirculating colloid mill (JM-60, Tiangang Machine Manufacture Co. Ltd.). The fiber suspensions were fed into the colloid mill for refinement of 6, 30 and 60 min. Bagasse fiber preforms were manufactured using a paper-making process, including a water filtration step and a hot press at 2.5 t and 120° C. for 15 mins. The morphologies were characterised by a field emission scanning electron microscope (FESEM JSM6335) operated at 5 kV. Tensile tests were carried out using Zwick Z030 tester at a speed of 1 mm/min with the 1 KN load cell. Air permeance was characterised using Tendring Pacific air permeability tester, which is designed based on the Gurley method. Water vapour transmission rate (WVTR) was tested using moisture management tester (MMT, SDLATLAS). FIG. 2 is a table showing characterisation results of refined bagasse fibers and their preforms.

Example 2. Making MFC or NFC Fibers

Micro-fibrillated cellulose (MFC) and nano-fibrillated cellulose (NFC) are produced by fibrillation of micrometer-sized cellulose fibers, either by passing a pulp solution through a high-pressure homogenizer or grinders.

MFC

Bagasse paper (3.5 wt. %) is cut and soaked in water for about 1 h, then blended in a blender for about 2 min. After about 24 h soaking and about 2 min blending, the pulp suspension is then mechanically grinded using super mass-colloider (MKCA6-2, Masuko Sangyo Co. Ltd., Kawaguchi, Japan) for about 1-5 passes.

NFC

Figure 3:
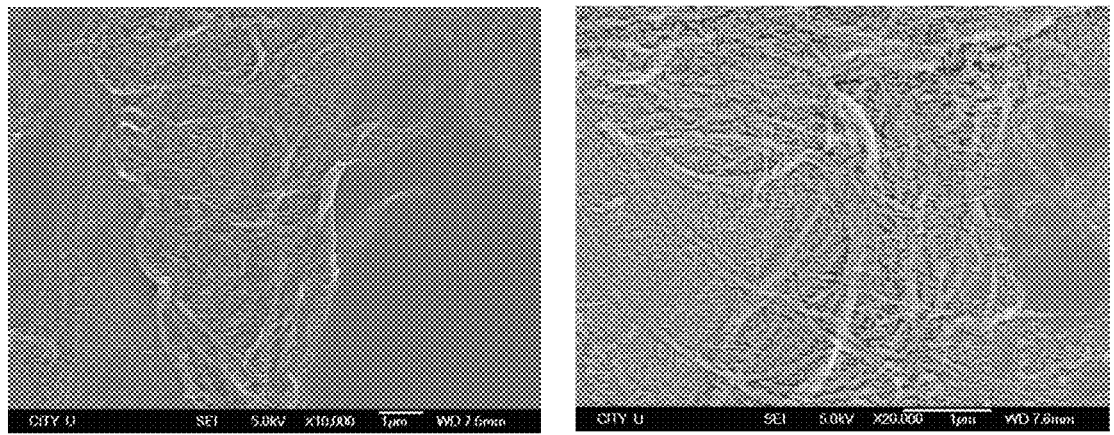
FIG. 3 is a set of SEM images showing nanofibrillated cellulose (NFC) of bagasse. Left image: ×10,000 magnification; right image: ×20,000 magnification.

Bagasse paper (3.5 wt. %) was cut and soaked in water for 1 h, then blended in a blender for 2 min. After 24 h soaking and 2 min blending, the pulp suspension was then mechanically grinded using super masscolloider (MKCA6-2, Masuko Sangyo Co. Ltd., Kawaguchi, Japan) for 10 passes. FIG. 3 is a set of SEM images showing the resulted NFC of bagasse. Left image: ×10,000 magnification; right image: ×20,000 magnification. The morphologies were characterized by a field emission scanning electron microscope (FESEM JSM6335) operated at 5 kV.

Example 3. Making MFC or NFC Enhanced Preforms 3.1. Co-Filtration

MFC and/or NFC dispersion with broad fiber diameters (e.g., 5-1000 nm) are mixed with bagasse fibers in water prior to co-filtration, which are followed by consolidation to produce a fiber preform. The MFC/NFC-bagasse fiber dispersion is filtered under vacuum onto a 125 mm diameter filter paper (VWR, Lutterworth, UK) using a Büchner funnel. The filter cake is wet pressed twice under a weight of 1 t for 2 min. This wet pressed filter cake is then further dried in a hot press at 120° C. overnight under a weight of 1 t.

3.2. Layered Wet Paper Based Materials

The samples comprised different layers of nanocellulose (NFC) and bagasse pulp fibers (Pulp). The paper-based composites were manufactured using a layer-by-layer filtration process. For the Pulp/NFC/Pulp composite, a layer of a bagasse suspension (0.5 wt. %) was filtered on top of a layer of nanocellulose suspension (0.5 wt. %) and on top of a pulp suspension. For the NFC/Pulp/NFC composites, the order was inverted. The final grammage of all the composites was 100 gsm.

TABLE 4

Tensile properties of the paper based layered composites.

| Sample | Tensile Strength MPa | Tensile Modulus GPa | Strain % | Tensile Strength KN · m$^{-1}$ | Tensile Index N · m · g$^{-1}$ |
|---|---|---|---|---|---|
| NFC/Pulp/NFC | 68.7 ± 5.8 | 7.8 ± 0.9 | 2.1 ± 0.5 | 7.3 ± 0.6 | 68.8 ± 4.7 |
| Pulp/NFC/Pulp | 35.0 ± 4.2 | 3.9 ± 0.6 | 2.1 ± 0.3 | 7.0 ± 0.6 | 59.6 ± 3.5 |
| NFC | 123.3 ± 9.6 | 10.6 ± 1.2 | 3.4 ± 0.8 | 14.6 ± 1.6 | 103.5 ± 6.9 |
| Pulp | 24.4 ± 7.3 | 3.3 ± 1.0 | 1.1 ± 0.4 | 4.8 ± 1.4 | 47.0 ± 5.7 |

TABLE 5

Water and oxygen permeability properties of the paper based layered composites. WVTR refers to water vapour transmission rate and OTR to Oxygen transmission rate.

| Sample | WVTR g/(m² 24 h) | OTR cm³/(m² 24 h · atm) |
|---|---|---|
| NFC/Pulp/NFC | 831 | >100000 |
| Pulp/NFC/Pulp | 892 ± 2 | 61 |
| NFC | 799 ± 54 | 80 ± 54 |
| Pulp | 2434 ± 99 | >100000 |

(The OTR of a bagasse pulp paper cannot be measured due to its high porosity)

Compared to Nanocellulose Foams

To speed up the filtration speed of nanocellulose, nanocellulose foams were created and collapsed in the filtration step. Nanocellulose suspension (0.5 wt. %) are normally made by blending the nanocellulose in water and then filtering it in a funnel with vacuum. However, to speed up the process, 0.2 g of soap were added to a 5 wt. % nanocellulose solution and foamed using a kitchen hand mixer Then the foam was poured into a filtration funnel and collapsed with 200 g of ethanol by spraying it into the foam. The filtration step only took 10 minutes as compared to 2 hours.

TABLE 6

Tensile properties of the foam NFC paper as compared to NFC and pulp papers.

| Sample | Tensile Strength MPa | Tensile Modulus GPa | Strain % | Tensile Strength KN · m⁻¹ | Tensile Index N · m · g⁻¹ |
|---|---|---|---|---|---|
| NFC Foam | 68.7 ± 7.9 | 7.9 ± 0.9 | 1.4 ± 0.3 | 7.6 ± 1.3 | 84.5.0 ± 10.0 |
| NFC | 123.3 ± 9.6 | 10.6 ± 1.2 | 3.4 ± 0.8 | 14.6 ± 1.6 | 103.5 ± 6.9 |
| Pulp | 24.4 ± 7.3 | 3.3 ± 1.0 | 1.1 ± 0.4 | 4.8 ± 1.4 | 47.0 ± 5.7 |

TABLE 7

Water and oxygen permeability properties of the foam NFC paper as compared to NFC and pulp papers.

| Sample | WVTR g/(m² · 24 h) | OTR cm³/(m² 24 h · atm) |
|---|---|---|
| NFC Foam | 749 ± 2 | 890 ± 728 |
| NFC | 799 ± 54 | 80 ± 54 |
| Pulp | 2434 ± 99 | >100000 |

3.3. NFC-Enhanced Paper Preforms with Different Structures.

The manufacturing process of paper performs consisted of two steps: 1) water filtration of fiber suspension (0.3 wt. %) and formation of wet paper preforms; 2) heat press of wet preforms with temperature and pressure control and formation of dry paper preforms (FIGS. 4a, 4b). By applying bagasse fiber (BG)/NFC mixture suspension in the filtration step, mixture samples with 50/50 BG/NFC were made (FIG. 4c). Layered samples were prepared using two methods: 1) performing filtration of NFC onto a wet BG preform to form NFC coating (FIG. 4d); 2) laminating the wet BG and NFC paper preforms and heat pressing the two layers together (FIG. 4e).

The wettability of the paper preforms were studied by performing contact angle measurements. Water droplet was absorbed in BG paper immediately, so no contact angle could be measured. Tensile tests were carried out using Zwick Z030 tester at a speed of 1 mm/min with the 1 KN load cell. The barrier properties were studied using gas permeability tester (VAC-VBS, Labthink Instruments) and water vapour transmission rate tester (W3/031, Labthink Instruments). FIG. 5 shows a comparison of baseline bagasse, NFC, and NFC-enhanced paper preforms with different structures.

Example 4. Making Composites

1) Post Impregnation

MFC and/or NFC-enhanced bagasse fiber preform is first produced. The fiber preform is then impregnation with a low viscosity liquid monomer (such as soybean oil, linseed oil or BIOCOAT), followed by a curing step.

2) Wet Impregnation

Polymers (in powder or fiber) are dispersed together with MFC/NFC and bagasse fibers. The resulting suspension is then filtered, followed by heat consolidation and drying steps to produce a composite in a single step.

3) Polymer Laminates

Thin polymer films of renewable thermoplastic, such as polylactic acid, bio-based polypropylene, or polyethylene, are laminated onto NFC/MFC-bagasse fiber preforms by heat consolidation, thereby creating a sandwich structure. Thin polymer films are produced by film line extrusion methods or DSM micro-compounder equipped with a slit die. Plasma treatments of the thermoplastic film are performed to introduce (water-stable) hydrophobic moieties onto the thermoplastic film.

PLA Composites

PLA (polylactic acid) was used as an example of a biobased polymer. NFC/PLA composites could not be tested, due to the fact that NFC was not attaching to the PLA. To produce the composites, a base paper made from different mixtures from NFC/Pulp was used to laminate the PLA composites. A mixture of NFC and pulp (wt. %) was blended together, filtered and consolidated as 200 gsm sheets. Two sheets were produced for each composites, where 5 g of a PLA film (100 gsm) were laminated between the 2 base papers.

TABLE 8

Tensile properties of the paper based PLA composites

| Sample | Tensile Strength MPa | Tensile Modulus GPa | Strain % |
|---|---|---|---|
| PLA | 46.6 ± 2.6 | 2.5 ± 0.6 | 1.8 ± 0.2 |
| NFC/PLA | X | X | X |
| Pulp/PLA | 53.2 ± 1.7 | 6.2 ± 0.6 | 1.9 ± 0.2 |
| 80% Pulp + 20% NFC/PLA | 77.1 ± 2.8 | 7.8 ± 0.6 | 1.6 ± 0.2 |
| 70% Pulp + 30% NFC/PLA | 88.2 ± 4.1 | 8.2 ± 0.6 | 1.7 ± 0.4 |
| 60% Pulp + 40% NFC/PLA | 88.3 ± 13.3 | 6.6 ± 0.3 | 1.3 ± 0.5 |

TABLE 9

Water and oxygen permeability properties of the paper based PLA composites.

| Sample | WVTR g/(m² · 24 h) | OTR cm3/(m² 24 h · atm) |
|---|---|---|
| PLA | 60 ± 2 | 1897 ± 6 |
| NFC/PLA | X | X |
| Pulp/PLA | Not tested | 902535 |
| 80% Pulp + 20% NFC/PLA | 66 ± 4 | 115 |
| 70% Pulp + 30% NFC/PLA | 26 ± 25 | 100 |
| 60% Pulp + 40% NFC/PLA | Not tested | 20 |

Example 5. Manufacture of Coffee Capsules

Figure 6:
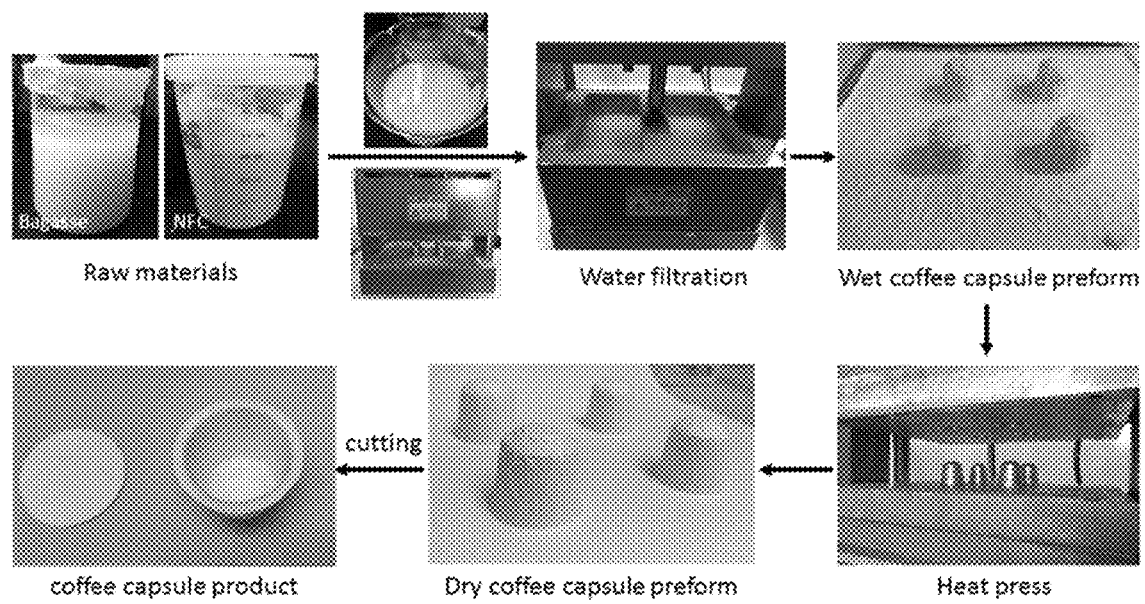
FIG. 6 is a flow chart showing manufacture of coffee capsules.
Figure 7:
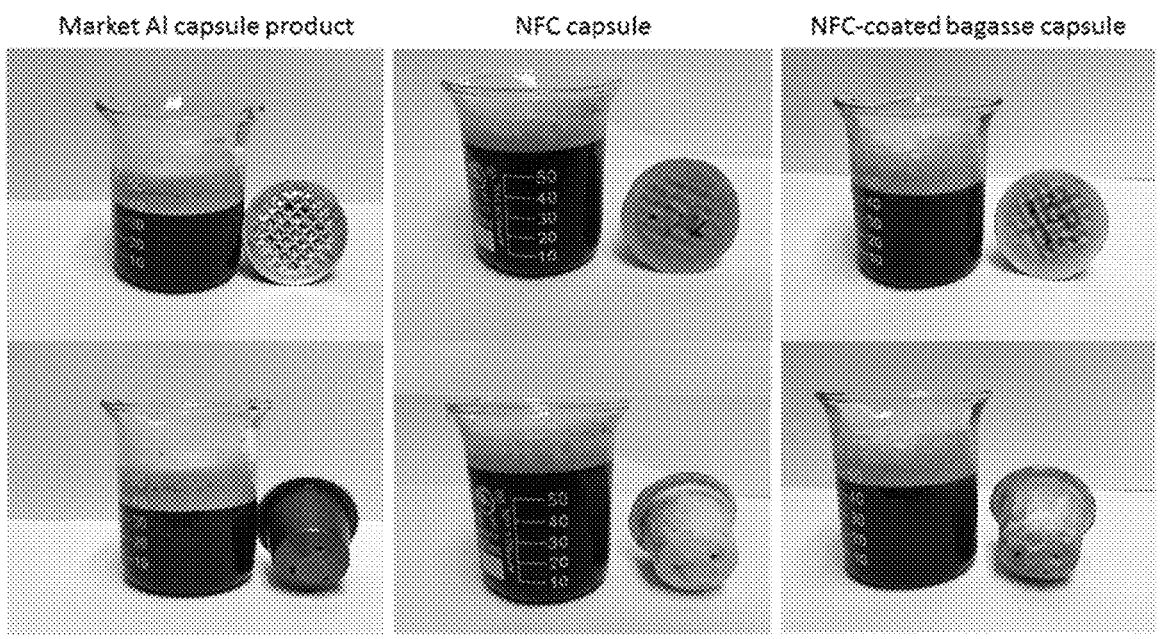
FIG. 7 is a set of images showing comparison of coffee capsules made of different materials.

Paper coffee capsule demonstrators were successfully produced by adopting a set of coffee capsule molds onto the in-house pulp moulding machine. The manufacture process is illustrated in FIG. 6. The functionality of paper capsules was proved by testing in the commercially available Nespresso coffee capsule machine, shown in FIG. 7.

While some embodiments have been shown and described herein, such embodiments are provided by way of example only. Numerous variations, changes, and substitutions will now occur to those skilled in the art without departing from the invention. It should be understood that various alternatives to the embodiments of the invention described herein can be employed in practicing the invention.

What is claimed is:

1. A material comprising:
   a first layer comprising a pulp, wherein the pulp is independently derived from a first plant fiber;
   a second layer comprising a fibrillated cellulose,
   wherein the fibrillated cellulose is independently derived from another plant fiber, and
   wherein the first layer is impregnated with the second layer to form a substantially continuous layer.

2. The material of claim 1, wherein the plant fiber comprises a fiber from one or more of the following: bagasse, flax, hemp, and palm.

3. The material of claim 1, wherein the fibrillated cellulose comprises micro-fibrillated cellulose (MFC).

4. The material of claim 1, wherein the fibrillated cellulose comprises nano-fibrillated cellulose (NFC).

5. The material of claim 1, wherein the material further comprising:
   a third layer that comprises a fibrillated cellulose, and
   wherein the first layer is disposed between the second layer and the third layer, wherein the first layer is impregnated with the second layer and the third layer to form the substantially continuous layer.

6. The material of claim 1, wherein the material further comprising:
   a another layer that comprises the pulp; and
   wherein the second layer is disposed between the first layer and the another layer, wherein the first layer and the another layer are impregnated with the second layer to form the substantially continuous layer.

7. The material of claim 1, wherein the fibrillated cellulose has an average diameter less than 100 nm.

8. The material of claim 1, wherein the first layer comprises a polymer.

9. The material of claim 8, wherein the polymer comprises one of the following: polylactic acid (PLA), chitin, sodium alginate, thermoplastic starch, polyethylene, chitosan, polyhydroxyalkanoates (PHA, bacterial polyesters), or polypropylene.

10. The material of claim 8, wherein the polymer is in a form of fiber or powder.

11. The material of claim 1, wherein the first layer is impregnated with the second layer in a shape of a consumer product.

12. The material of claim 11, wherein the consumer product comprises one of the following: a food package, a food serving vehicle, a motor vehicle, a home or office appliance, an electronic device, home or office furniture, or a children's product.

13. The material of claim 11, wherein the consumer product comprises one of the following: a sheet, bag, container, plate, or tray.

14. The material of claim 11, wherein the consumer product comprises a container for instant noodles.

15. The material of claim 11, wherein the consumer product comprises a coffee capsule, a coffee pod, a coffee pouch, or a single-use coffee container.

16. The material of claim 15, wherein the coffee capsule comprises a capsule main body (CMB) and a capsule lid (CL).

17. The material of claim 1, wherein the another plant fiber comprises a fiber from bamboo.

18. A method of making a material, comprising
   positioning a first layer to receive a second layer, wherein the first layer comprises a pulp and the second layer comprises a fibrillated cellulose;
   filtering the second layer on top of the first layer, such that the first layer is impregnated with the second layer to form a substantially continuous layer; and
   wherein the pulp and the fibrillated cellulose are independently derived from a plant fiber.

19. A method of making a composite, comprising:
   preparing a material via mixing plant cellulose, fibrillated cellulose, and a polymer in a liquid resin;
   suspending a base layer in the liquid resin; and
   removing the base layer from the liquid resin, wherein the base layer is impregnated with the material to form the composite at a cellulose level.

20. A method of manufacturing a consumer product, comprising:
   preparing a material via mixing a plant cellulose and a fibrillated cellulose in a liquid resin;
   suspending a base layer in the liquid resin;
   removing the base layer from the liquid resin, wherein the base layer is impregnated with the material to form the composite at a cellulose level; and
   forming the composite into a structure of the consumer product.

* * * * *